United States Patent
Kwak et al.

(10) Patent No.: US 11,044,501 B2
(45) Date of Patent: Jun. 22, 2021

(54) APPARATUS AND METHOD FOR TRANSMITTING OR RECEIVING BROADCAST SIGNAL

(71) Applicant: LG ELECTRONICS INC., Seoul (KR)

(72) Inventors: Minsung Kwak, Seoul (KR); Seungryul Yang, Seoul (KR); Woosuk Ko, Seoul (KR); Jangwon Lee, Seoul (KR); Kyoungsoo Moon, Seoul (KR); Sungryong Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/862,312

(22) Filed: Apr. 29, 2020

(65) Prior Publication Data

US 2020/0296434 A1 Sep. 17, 2020

Related U.S. Application Data

(63) Continuation of application No. 16/275,970, filed on Feb. 14, 2019, now Pat. No. 10,674,186, which is a (Continued)

(51) Int. Cl.
*H04N 21/236* (2011.01)
*H04N 21/2362* (2011.01)
(Continued)

(52) U.S. Cl.
CPC ....... *H04N 21/2362* (2013.01); *H04N 21/236* (2013.01); *H04N 21/2383* (2013.01); *H04N 21/438* (2013.01); *H04N 21/4385* (2013.01); *H04N 21/6112* (2013.01); *H04N 21/6125* (2013.01); *H04N 21/6332* (2013.01); (Continued)

(58) Field of Classification Search
CPC ............ H04N 21/2362; H04N 21/236; H04N 21/2383; H04N 21/438; H04N 21/4385; H04N 21/6112; H04N 21/6125; H04N 21/6332; H04N 21/64322; H04N 21/84; H04N 21/858
See application file for complete search history.

(56) References Cited

U.S. PATENT DOCUMENTS

| | | |
|---|---|---|
| 2011/0041065 A1 | 2/2011 | Bangma et al. |
| 2012/0331508 A1 | 12/2012 | Vare et al. |
| 2017/0264966 A1 | 9/2017 | Kitahara ............ H04N 21/6125 |

FOREIGN PATENT DOCUMENTS

| | | |
|---|---|---|
| KR | 10-2010-0105314 A | 9/2010 |
| KR | 10-2014-0107169 A | 9/2014 |
| KR | 2008-0064186 A | 7/2018 |

OTHER PUBLICATIONS

U.S. Appl. No. 15/746,323.

*Primary Examiner* — Nicholas T Corbo
(74) *Attorney, Agent, or Firm* — Dentons US LLP

(57) ABSTRACT

A method for transmitting a broadcast signal is disclosed. The method for transmitting a broadcast signal according to an embodiment of the present invention includes performing delivery layer processing of a broadcast service data and signaling information for the broadcast service data, performing UDP/IP encapsulation of a broadcast service data and signaling information for the broadcast service data and performing physical layer processing of a broadcast service data and signaling information for the broadcast service data.

10 Claims, 28 Drawing Sheets

Related U.S. Application Data continuation of application No. 15/746,323, filed as application No. PCT/KR2016/007973 on Jul. 21, 2016, now Pat. No. 10,212,461.

(60) Provisional application No. 62/202,788, filed on Aug. 8, 2015, provisional application No. 62/199,971, filed on Jul. 31, 2015, provisional application No. 62/203,355, filed on Aug. 10, 2015, provisional application No. 62/197,585, filed on Jul. 28, 2015, provisional application No. 62/197,086, filed on Jul. 26, 2015, provisional application No. 62/194,844, filed on Jul. 21, 2015.

(51) Int. Cl.
  *H04N 21/438* (2011.01)
  *H04N 21/4385* (2011.01)
  *H04N 21/858* (2011.01)
  *H04N 21/2383* (2011.01)
  *H04N 21/6332* (2011.01)
  *H04N 21/84* (2011.01)
  *H04N 21/643* (2011.01)
  *H04N 21/61* (2011.01)

(52) U.S. Cl.
  CPC ....... *H04N 21/64322* (2013.01); *H04N 21/84* (2013.01); *H04N 21/858* (2013.01)

[Figure 1]
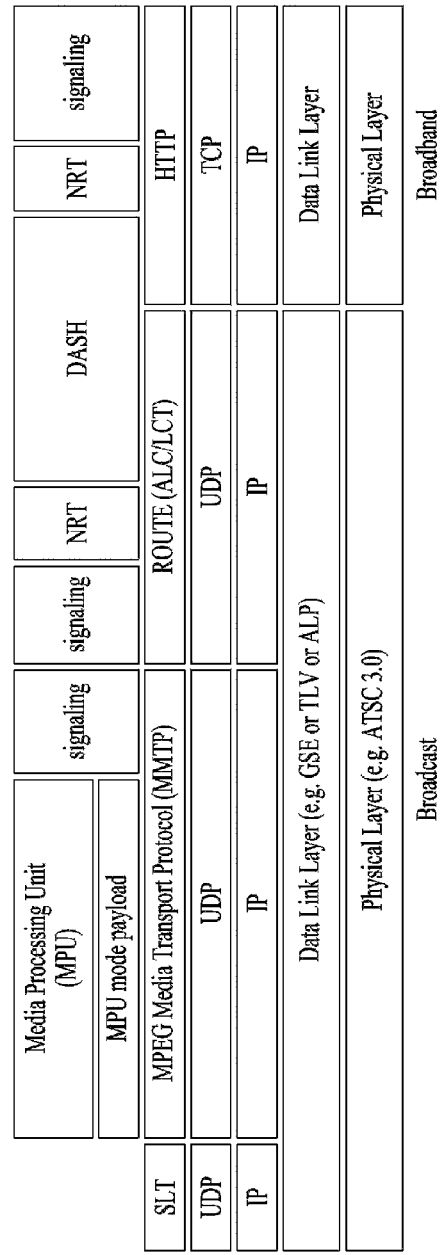

[Figure 2]
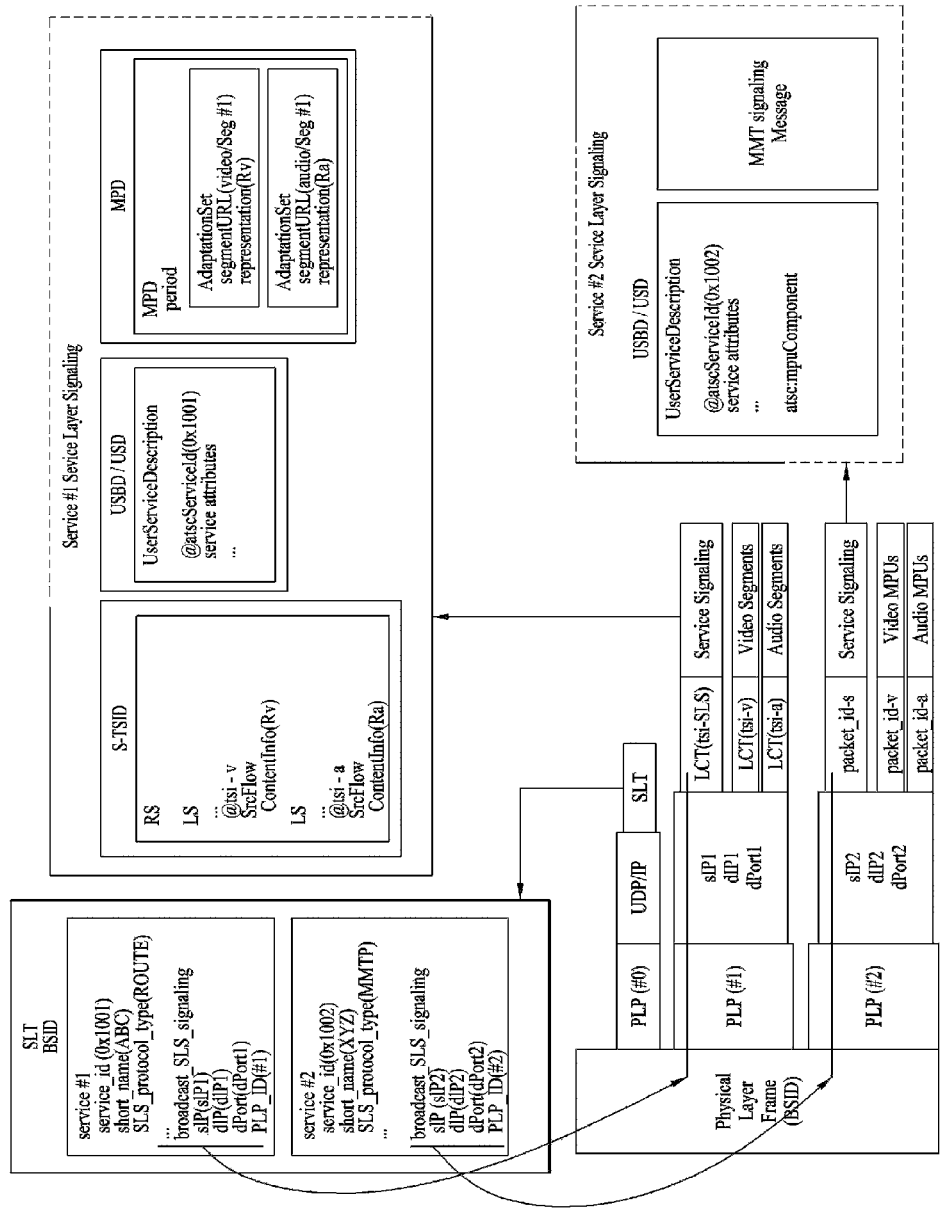

【Figure 3】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

【Figure 4】

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string | t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

[Figure 5]

| Element or Attribute Name | | | | | | Use |
|---|---|---|---|---|---|---|
| bundleDescription | | | | | | |
| | userServiceDescription | | | | | |
| | | @globalServiceID | | | | M |
| | | @serviceID | | | | M |
| | | Name | | | | 0..N |
| | | | @lang | | | CM |
| | | serviceLanguage | | | | 0..N |
| | | contentAdvisoryRating | | | | 0..1 |
| | | Channel | | | | 1 |
| | | | @serviceGenre | | | 0..1 |
| | | | @serviceIcon | | | 1 |
| | | | ServiceDescription | | | 0..N |
| | | | | @serviceDescrText | | 1 |
| | | | | @serviceDescrLang | | 0..1 |
| | | mpuComponent | | | | 0..1 |
| | | | @mmtPackageId | | | 1 |
| | | | @nextMmtPackageId | | | 0..1 |
| | | routeComponent | | | | 0..1 |
| | | | @sTSIDUri | | | 1 |
| | | | @sTSIDDestinationIpAddress | | | 0..1 |
| | | | @sTSIDDestinationUdpPort | | | 1 |
| | | | @sTSIDSourceIpAddress | | | 1 |
| | | | @sTSIDMajorProtocolVersion | | | 0..1 |
| | | | @sTSIDMinorProtocolVersion | | | 0..1 |
| | | broadbandComponent | | | | 0..1 |
| | | | @fullMPDUri | | | 1 |
| | | ComponentInfo | | | | 1..N |
| | | | @ComponentType | | | 1 |
| | | | @ComponentRole | | | 1 |
| | | | @ComponentProtectedFlag | | | 0..1 |
| | | | @ComponentId | | | 1 |
| | | | @ComponentName | | | 0..1 |

[Figure 6]
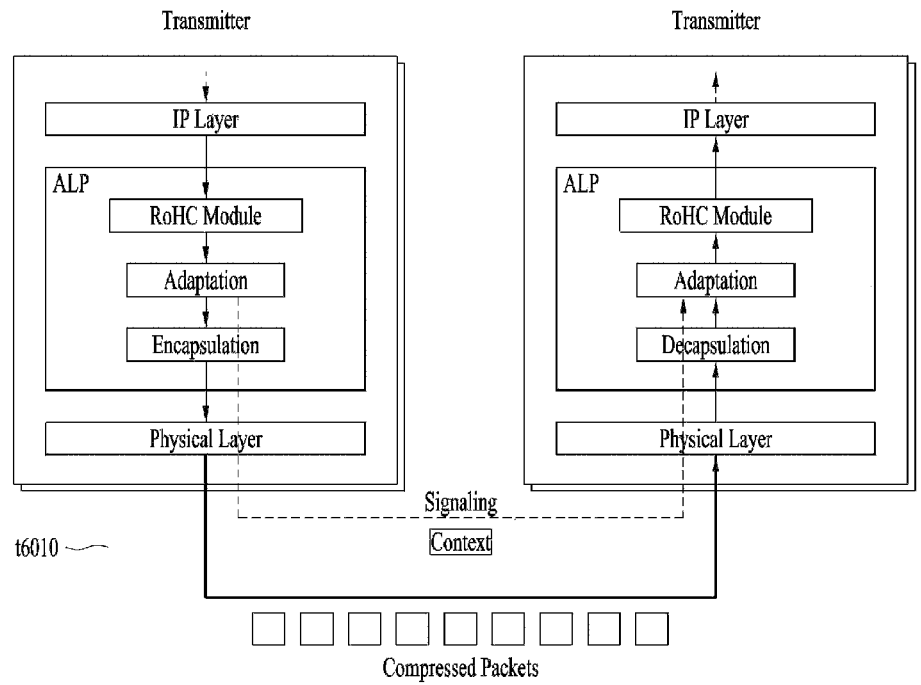
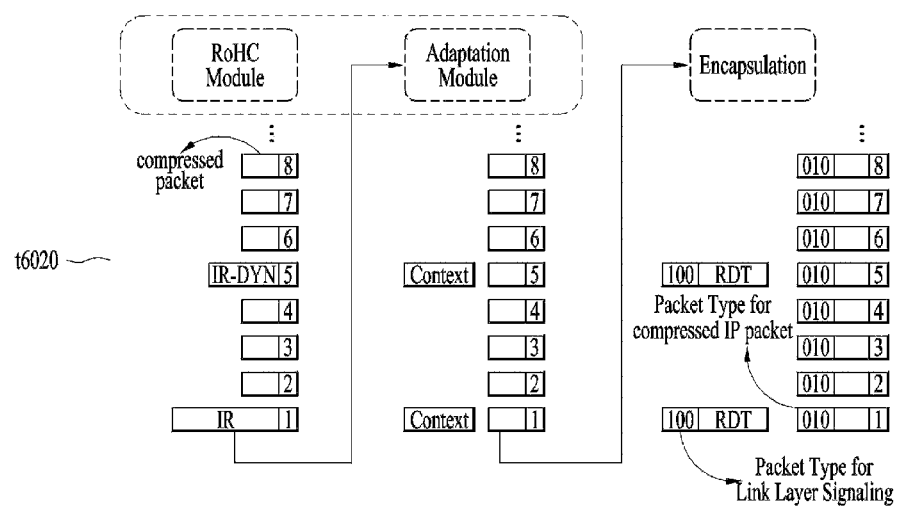

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1") { | | |
|             context_id | 8 | uimsbf |
|         } | | |
|     } | | |
| } | | |

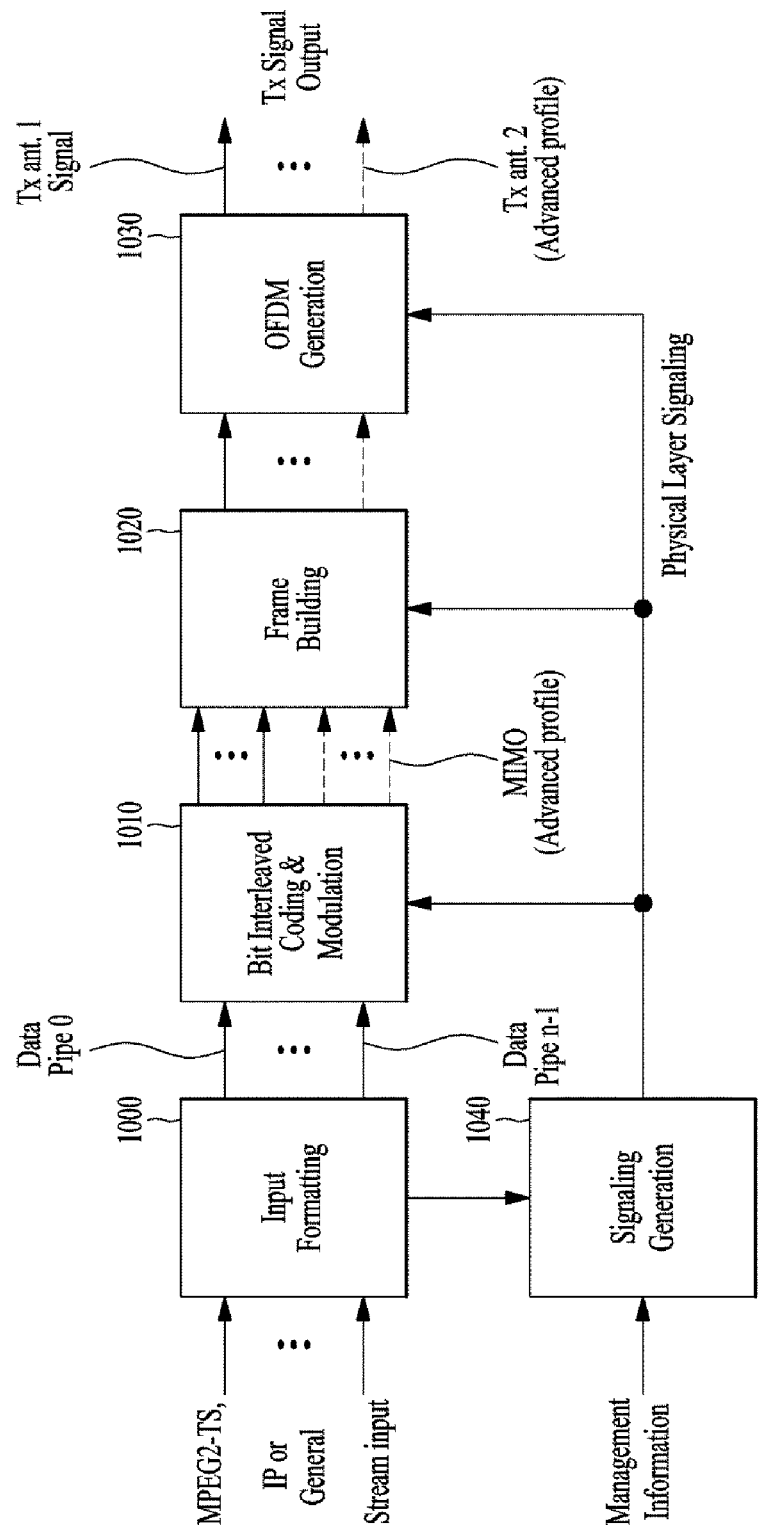

[Figure 9]

[Figure 10]
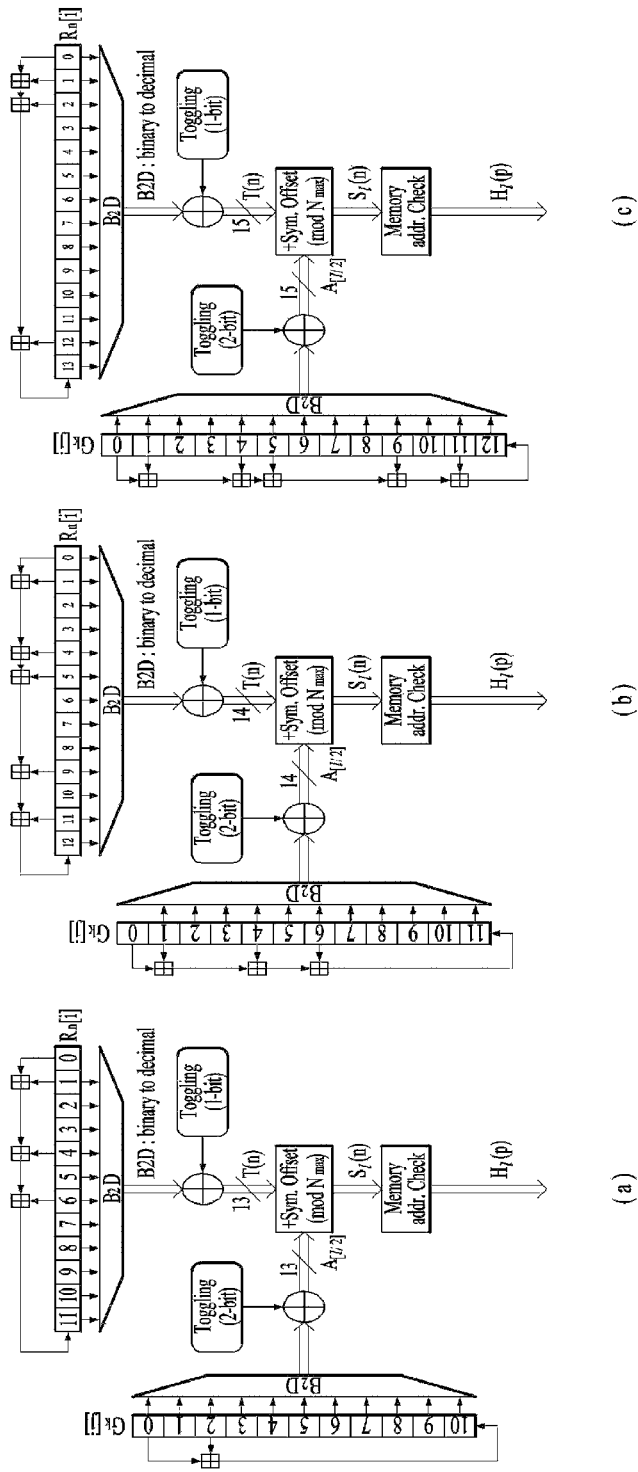

【Figure 11】
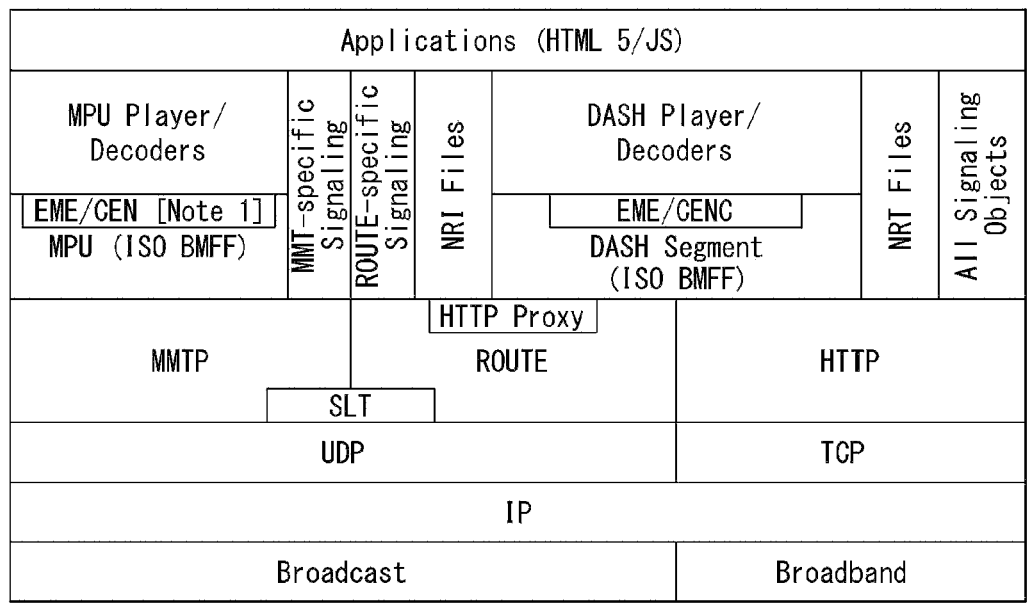

[Figure 12]
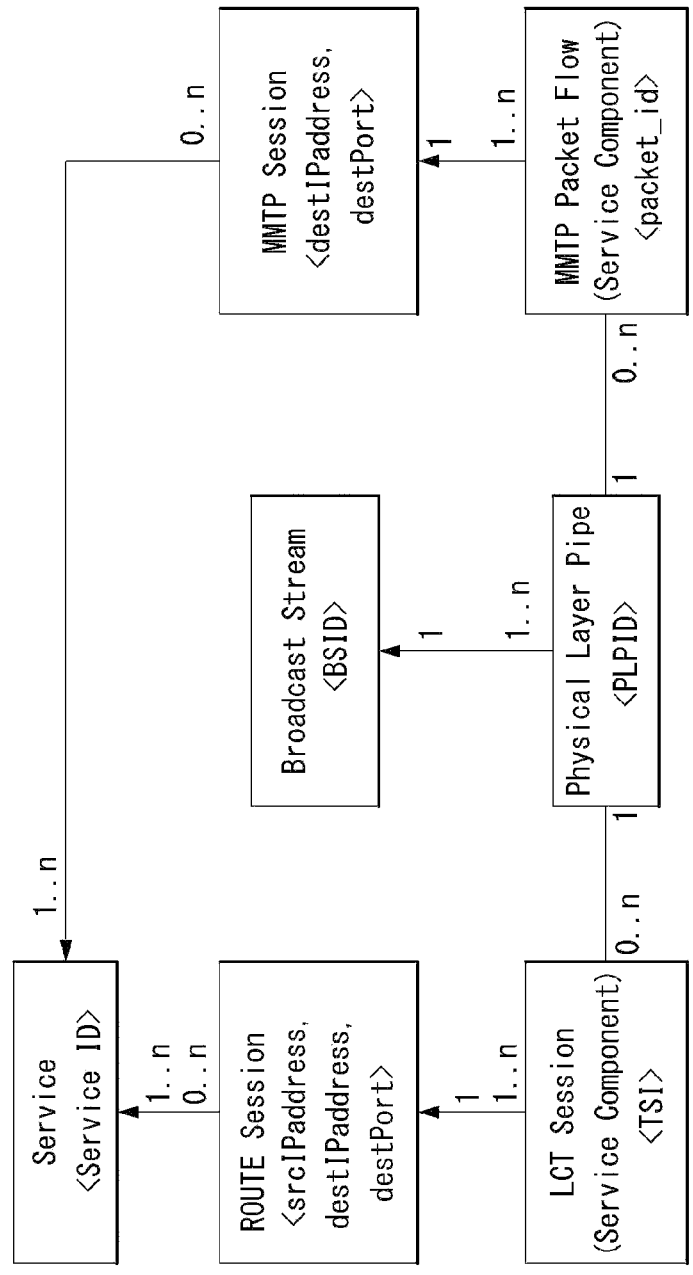

[Figure 13A]

| P1 | L1 | Common DP | Scheduled & interleaved DP's | | | | Auxiliary data |
|----|----|-----------|------------------------------|----|----|----|----------------|
|    |    |           | DP1 | DP2 | ... | DPn |                |

[Figure 13B]

| P1 | L1 | Fast Information Channel | Scheduled & interleaved DP's | | | | Auxiliary data |
|----|----|--------------------------|------------------------------|----|----|----|----------------|
|    |    |                          | DP1 | DP2 | ... | DPn |                |

[Figure 14]
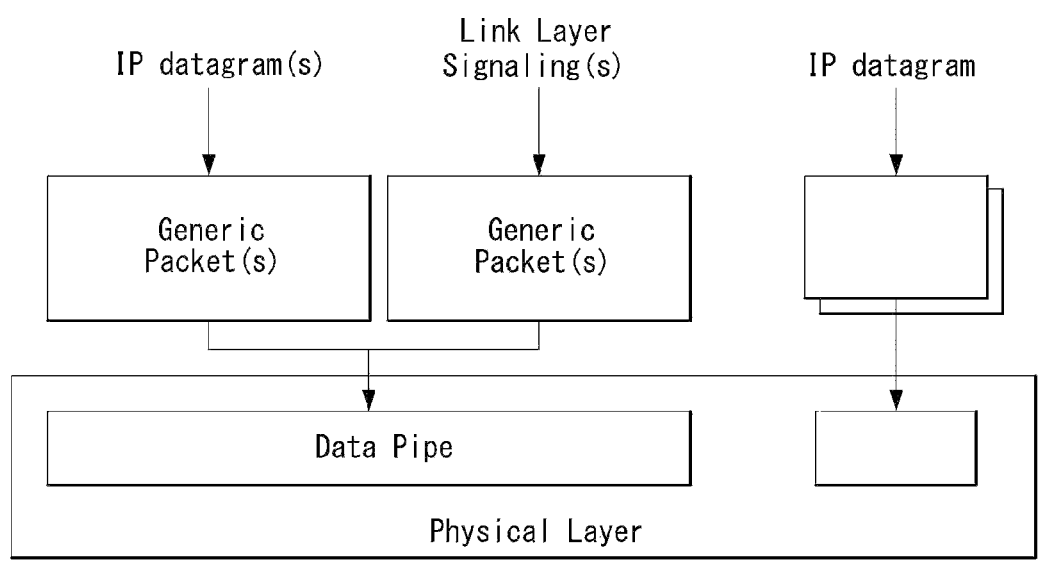

[Figure 15]
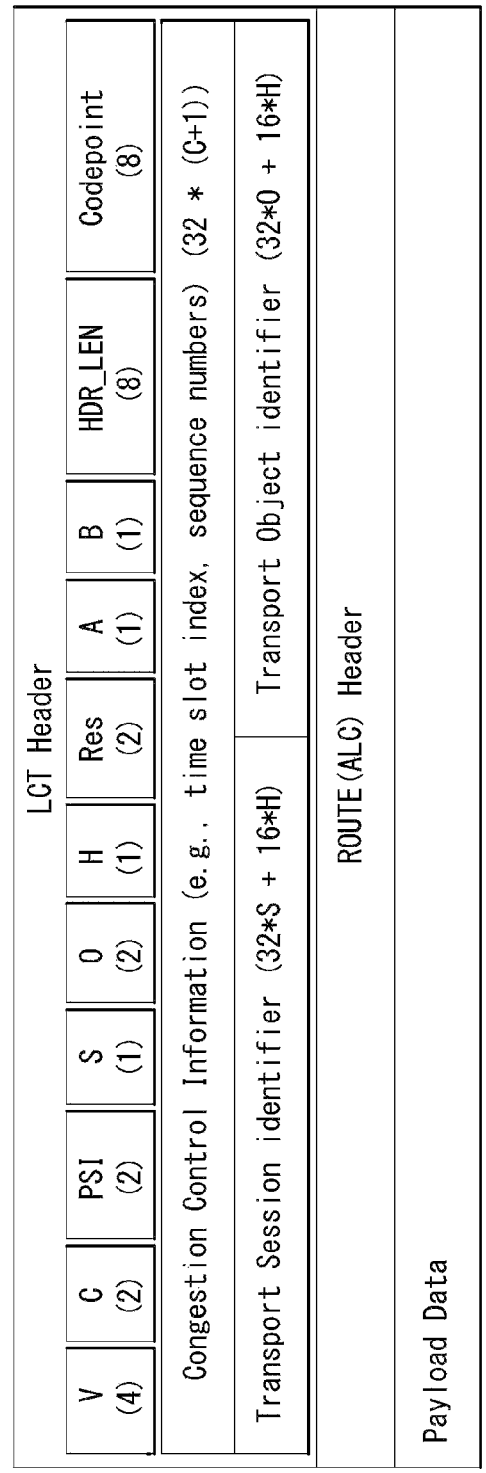

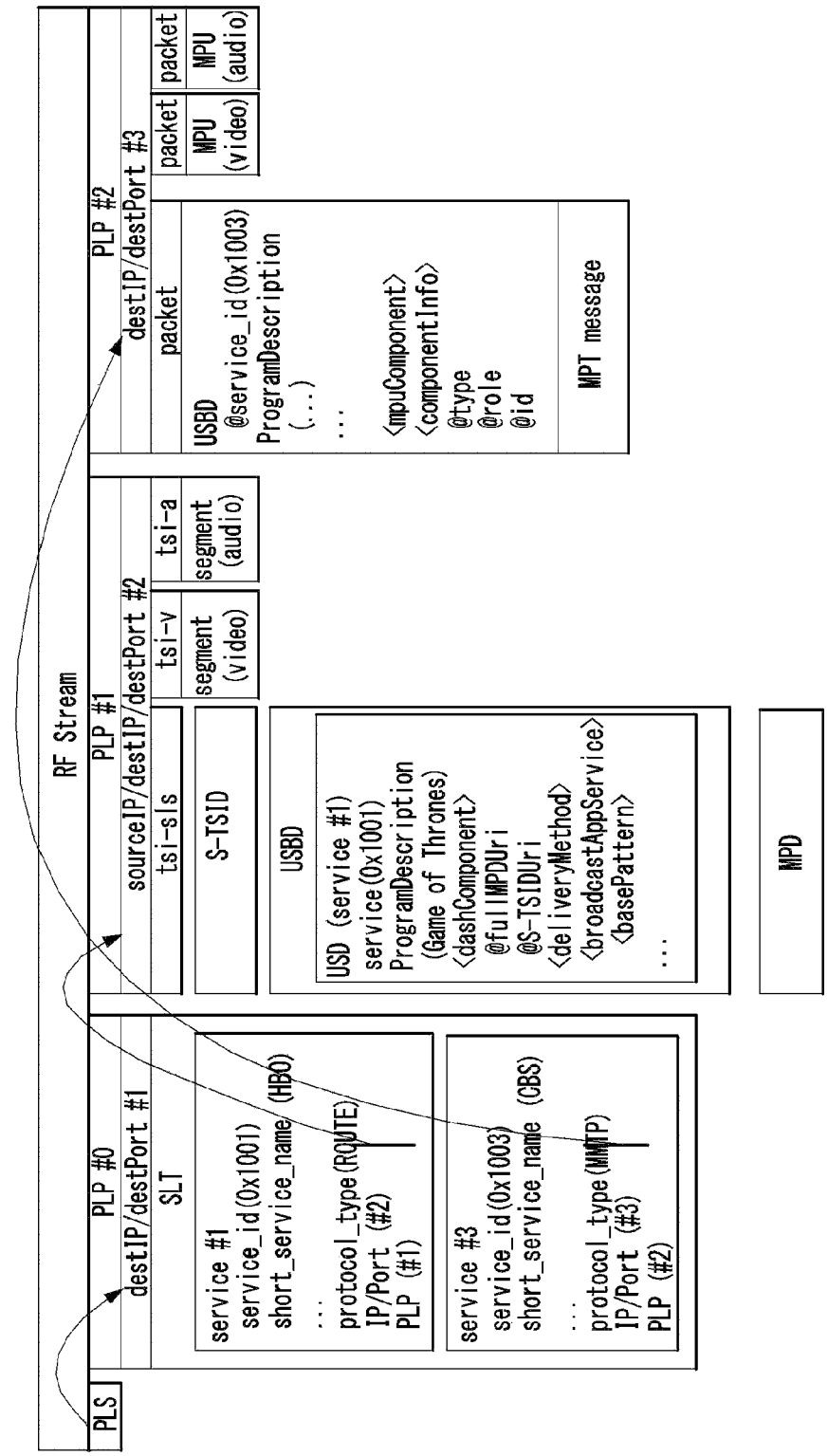
[Figure 16]

[Figure 17]

| Element Name | | | Cardinality | Data Type |
|---|---|---|---|---|
| EMT | | | | |
| | mpdId | | 1 | string |
| | PeriodId | | 1 | string |
| | EventStream | | 1..N | |
| | | @schemeIdURi | R | anyURI |
| | | @value | O | string |
| | | @timescale | O | unsignedInt |
| | | Event | 0..N | string |
| | | @presentationTime | OD | unsignedLong |
| | | @duration | O | unsignedLong |
| | | @id | O | unsignedInt |

[Figure 18]

| Element Name | | | Cardinality | Data Type |
|---|---|---|---|---|
| AEI | | | | |
| | @assetId | | 1 | string |
| | @mpuSeqNum | | 1 | unsignedInt |
| | EventStream | | 1..N | |
| | | @schemeIdURi | R | anyURI |
| | | @value | O | string |
| | | Event | 0..N | string |
| | | @presentationTime | OD | unsignedLong |
| | | @duration | O | unsignedLong |
| | | @id | O | unsignedInt |

[Figure 19]

```
aligned(8) class DASHEventMessageBox extends FullBox( 'emsg' ,
version = 0, flags = 0) {
    string scheme_id_uri;
    string value;
    unsigned int(32) timescale;
    unsigned int(32) presentation_time_delta;
                        /* relative to the earliest presentation
time in this segment */
    unsigned int(32) event_duration;
    unsigned int(32) id;
    unsigned int(8) message_data[]; }
}
```

[Figure 20]

```
aligned(8) class EventInformationBox extends FullBox( 'evti' , version =
0, flags = 0) {
    string scheme_id_uri;
    string value;
    unsigned int(32) event_id;
    unsigned int(32) event_presentation_time_delta;
                                        /*relative to the earliest presentation
    time in this MPU */
    unsigned int(32) event_duration;
    unsigned int(8) event_data[]; }
}
```

[Figure 21]

| Field | Bits |
| --- | --- |
| schemeIdUri_field_size(N1) | 6 |
| value_field_size(N2) | 2 |
| data_field_length(N3) | 6 |
| reserved | 2 |
| schemeIdUri | 8*N1 |
| value | 8*N2 |
| Timescale [omitted in MMT case] | 8 |
| presentation_time | 32 |
| duration | 32 |
| id | 16 |
| data | 8*N3 |

[Figure 22]

```
@schemeIdUri = "urn:atsc:3.0"  (or  "http://atsc.com/3.0" )
@value = "tud"
@timescale [omitted in MMT case]
@presentationTime
@duration
@id
@data - one character decimal integer - specifies
number of seconds of jitter to allow when requesting
table update
```

[Figure 23]

| Syntax | No. of Bits |
|---|---|
| service_list_table_section() { | |
|   table_id | 8 |
|   SLT_section_version | 4 |
|   SLT_section_length | 12 |
|   SLT_protocol_version | 8 |
|   broadcast_stream_id | 16 |
|   SLT_section_number | 4 |
|   last_SLT_section_number | 4 |
|   num_services | 8 |
|   for (i=0; i<num_services;i++) { | |
|     service_id | 16 |
|     SLT_service seq_number | 3 |
|     protected | 1 |
|     major_channel_number | 10 |
|     minor_channel_number | 10 |
|     service_category | 4 |
|     short_service_name_length/* m */ | 4 |
|     short_service_name() | 8*m |
|     broadcast_signaling_present | 1 |
|     broadband_access_required | 1 |
|     if (broadcast_signaling_present) { | |
|       SLS_source_IP_address_present | 1 |
|     } | |
|     else{ | |
|       reserved | 1 |
|     } | |
|     hidden | 1 |
|     SLS_protocol_type | 4 |
|     if (broadcast_signaling_present) { | |
|       SLS_PLP_ID | 8 |
|       SLS_destination_IP_address | 32 |
|       SLS_destination_UDP_port | 16 |
|       if (SLS_source_address_present) { | |
|         SLS_source_IP_address | 32 |
|       } | |
|       SLS_protocol_version | 8 |
|       reserved | 4 |
|       num_ext_length_bits/* b */ | 4 |
|       if (num_ext_length_bits>0) { | |
|         if (num_ext_length_bits%8)!=0{ | |
|           reserved1 | (8-b%8) |
|         } | |
|         ext_length/* e */ | b |
|         reserved2() | 8*e |
|       } | |
|     } | |
|     reserved | 4 |
|     num_service_level_descriptors | 4 |
|     for (j=0;j<num_service_level_descriptors;j++) { | |
|       service_level_descriptor() | var |
|     } | |
|   } | |
|   reserved | 4 |
|   num_SLT_level_descriptors | 4 |
|   for (n=0; n<num_SLT_level_descriptors; n++) { | |
|     SLT_level_descriptor() | var |
|   } | |
|   for (k=0; k<N; k++) { | |
|     reserved3 | 8 |
|   } | |
| } | |

[Figure 24]

| Element or Attribute Name | | Use |
|---|---|---|
| SLT | | |
| | @bsid | 1 |
| | @@sltSectionVersion | 1 |
| | @sltSectionNumber | 0..1 |
| | @totalSltSectionNumbers | 0..1 |
| | @language | 0..1 |
| | @capabilities | 0..1 |
| | InetSigLocation | 0..1 |
| | Service | 1..N |
| |    @serviceId | 1 |
| |    @SLTserviceSeqNumber | 1 |
| |    @protected | 0..1 |
| |    @majorChannelNo | 1 |
| |    @minorChannelNo | 1 |
| |    @serviceCategory | 1 |
| |    @shortServiceName | 1 |
| |    @hidden | 0..1 |
| |    @SLSProtocolType | 1 |
| |    BroadcastSignaling | 0..1 |
| |    @slsPlpId | 0..1 |
| |    @slsDestinationIpAddress | 0..1 |
| |    @slsDestinationUdpPort | 0..1 |
| |    @slsSourceIpAddress | 0..1 |
| |    @slsMajorProtocolVersion | 0..1 |
| |    @SlsMinorProtocolVersion | 0..1 |
| |    @serviceLanguage | 0..1 |
| |    @broadbandAccessRequired | 0..1 |
| |    @capabilities | 0..1 |
| |    InetSigLocation | 0..1 |

[Figure 25A]

| Syntax | No. of Bits | Format |
|---|---|---|
| inet_signaling_location_descriptor() { | | |
|   descriptor_tag | 8 | TBD |
|   descriptor_length | 8 | uimsbf |
|   URL_type | 8 | uimsbf |
|   URL_bytes () | 8*(descriptor_length-1) | uimsbf |
| } | | |

[Figure 25B]

| Element or Attribute | Usage | Datatype |
|---|---|---|
| InetSigLoc | 0..N | anyURL |
|   @urlType | 1 | unsignedByte |

[Figure 26]

| Element or Attribute Name | | | | Use |
|---|---|---|---|---|
| bundleDescription | | | | |
| | userServiceDescription | | | |
| | | @serviceId | | M |
| | | @atsc:serviceId | | M |
| | | @atsc:serviceStatus | | 0..1 |
| | | @atsc:fullMPDUri | | M |
| | | @atsc:sTSIDUri | | M |
| | | name | | 0..N |
| | | | lang | CM |
| | | serviceLanguage | | 0···N |
| | | atsc:capabilityCode | | 0···1 |
| | | deliveryMethod | | 1..N |
| | | | r12:broadcastAppService | 1..N |
| | | | | basePattern | 1..N |
| | | | r12:unicastAppService | 0..N |
| | | | | basePattern | 1..N |

Legend:
For attributes: M=Mandatory, O=Optional, OD=Optional with Default Value, CM=Conditionally Mandatory.
For elements:<minOccurs>...<maxOccurs> (N=unbounded) Note that the conditions only holds without using xlink:href. If linking is used, then all attributes are "optional" and <minOccurs=0>
Elements are bold; attributes are non-bold and preceded with an @.

[Figure 27]

| | | | |
|---|---|---|---|
| | atsc:routeComponent | | 0..1 |
| | | @atsc:sTSIDUri | M |
| | | @slsMajorprotocolVersion | OD |
| | | @slsMinorprotocolVersion | OD |
| | atsc:broadbandComponent | | 0..1 |
| | | @atsc:fullfMPDUri | M |
| | | @slsMajorprotocolVersion | OD |
| | | @slsMinorprotocolVersion | OD |

[Figure 28]
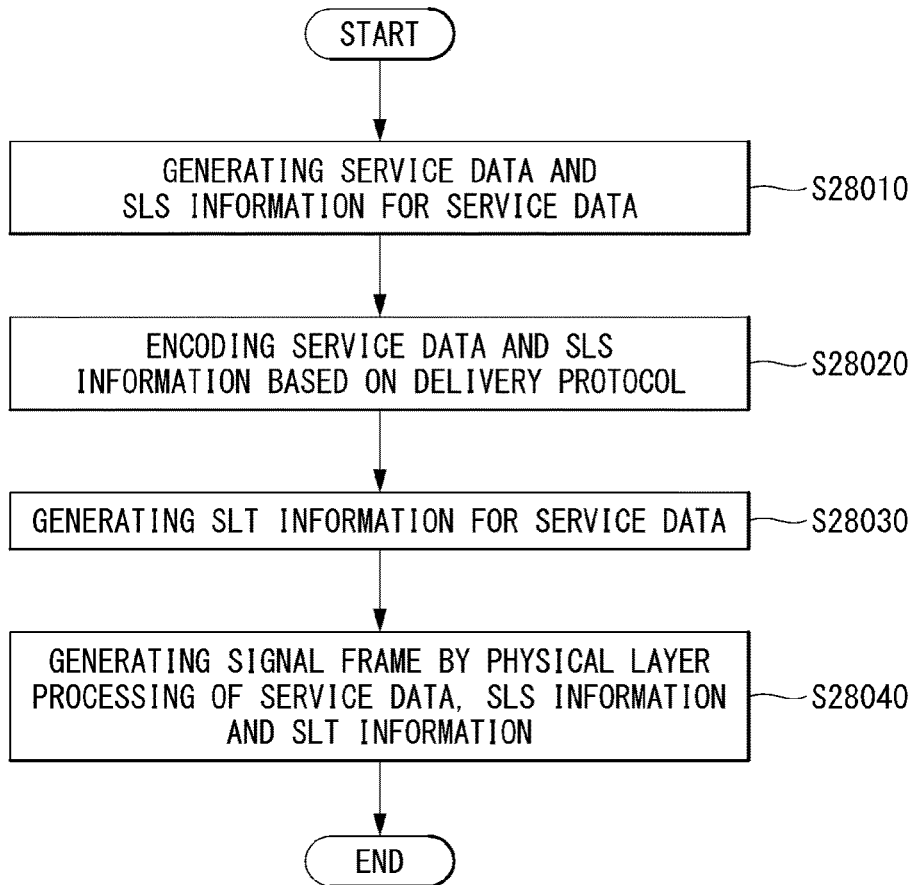
[Figure 29]
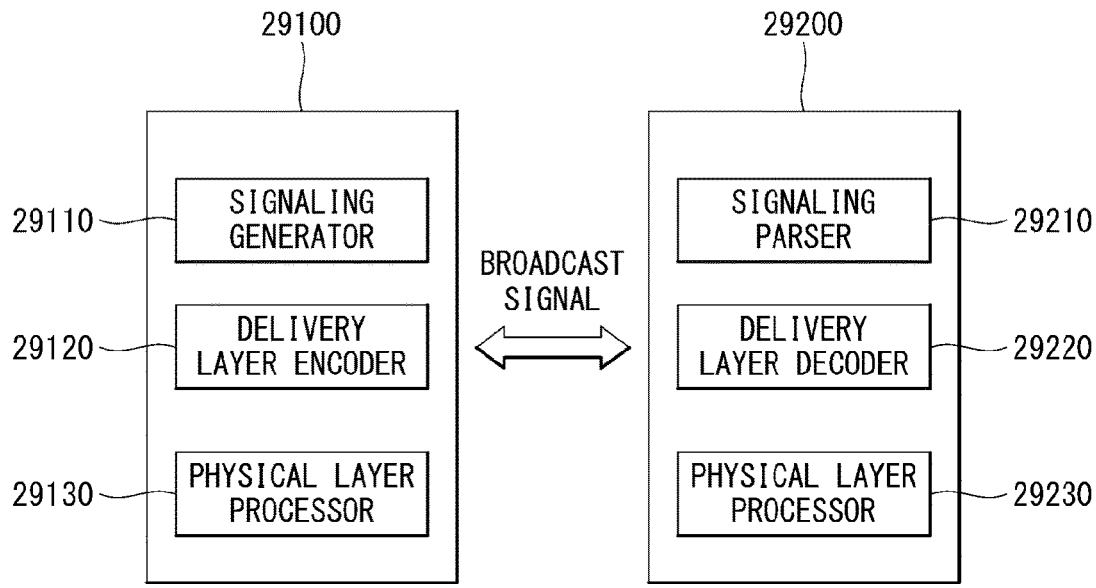

APPARATUS AND METHOD FOR TRANSMITTING OR RECEIVING BROADCAST SIGNAL

This application is a continuation application of U.S. application Ser. No. 16/275,970, filed Feb. 14, 2019, which is a continuation of U.S. application Ser. No. 16/237,350 filed on Dec. 31, 2018, now abandoned, which is a continuation Application of U.S. Ser. No. 15/746,323, filed Jan. 19, 2018, which is the National Stage filing under 35 U.S.C. 371 of International Application No. PCT/KR2016/007973 filed on Jul. 21, 2016, which claims the benefit of U.S. Provisional Application No. 62/194,844 filed on Jul. 21, 2015, U.S. Provisional Application No. 62/197,086 filed on Jul. 26, 2015 and U.S. Provisional Application No. 62/197,585 filed on Jul. 28, 2015, U.S. Provisional Application No. 62/199,971 filed on Jul. 31, 2015, U.S. Provisional Application No. 62/202,788 filed on Aug. 8, 2015 and U.S. Provisional Application No. 62/203,355 filed on Aug. 10, 2015, the contents of which are all hereby incorporated by reference herein in their entirety.

TECHNICAL FIELD

The present invention relates to an apparatus for transmitting a broadcast signal, an apparatus for receiving a broadcast signal, a method for transmitting a broadcast signal and a method for receiving a broadcast signal.

CROSS-REFERENCE TO RELATED APPLICATIONS

This application is the National Stage filing under 35 U.S.C. 371 of International Application No. PCT/KR2016/007973 filed on Jul. 21, 2016, which claims the benefit of U.S. Provisional Application No. 62/194,844 filed on Jul. 21, 2015, U.S. Provisional Application No. 62/197,086 filed on Jul. 26, 2015 and U.S. Provisional Application No. 62/197,585 filed on Jul. 28, 2015, U.S. Provisional Application No. 62/199,971 filed on Jul. 31, 2015, U.S. Provisional Application No. 62/202,788 filed on Aug. 8, 2015 and U.S. Provisional Application No. 62/203,355 filed on Aug. 10, 2015, the contents of which are all hereby incorporated by reference herein in their entirety.

BACKGROUND ART

As analog broadcast signal transmission comes to an end, various technologies for transmitting/receiving digital broadcast signals have been developed. A digital broadcast signal may include a larger amount of video/audio data than an analog broadcast signal and may further include various types of additional data in addition to the video/audio data.

DISCLOSURE

Technical Problem

A digital broadcast system may provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The present invention proposes a method for transmitting a broadcast signal and an apparatus for transmitting a broadcast signal.

A method for transmitting a broadcast signal according to an embodiment of the present invention may include generating service data for a broadcast service and service layer signaling (SLS) information for the service data; encoding the service data and the SLS information based on a delivery protocol, wherein the delivery protocol is a ROUTE (Real-Time Object Delivery over Unidirectional Transport) protocol or an MMT (MPEG Media Transport) protocol; generating service list table (SLT) information for the service data, wherein the SLT information includes bootstrap information for discovery of the SLS information; and generating a signal frame by physical layer processing of the service data, the SLS information and the SLT information, wherein the SLT information may further include URL information of a URL (Uniform Resource Locator) for obtaining signaling data via broadband and URL type information indicating the type of data available via the URL, wherein the URL indicated by the URL type information is either a URL of a signaling server or a URL of an ESG (Electronic Service Guide) server.

A broadcast signal transmitter according to an embodiment of the present invention may include a signaling generator generating service layer signaling (SLS) information for service data for a broadcast service and service list table (SLT) information for the service data, wherein the SLT information includes bootstrap information for discovery of the SLS information; a delivery layer encoder encoding the service data and the SLS information based on a delivery protocol, wherein the delivery protocol is a ROUTE (Real-Time Object Delivery over Unidirectional Transport) protocol or an MMT (MPEG Media Transport) protocol; and a physical layer processor generating a signal frame by physical layer processing of the service data, the SLS information and the SLT information, wherein the SLT information may further include URL information of a URL (Uniform Resource Locator) for obtaining signaling data or ESG (Electronic Service Guide) data via broadband and URL type information indicating the type of data available via the URL, wherein the URL for the signaling data indicated by the URL type information is either a URL of a signaling server or a URL of an ESG server for the ESG data.

The URL information may include first level URL information for obtaining the signaling data for all of the services in the SLT information or the ESG data; and second level URL information for obtaining the signaling data for one service in the SLT information or the ESG data.

According to an embodiment, when the URL indicated by the URL type information is a URL of the signaling server, the URL information is used for generating an HTTP request message for the signaling data along with one or more additional information elements, and the one or more additional information elements may include at least one of service information indicating a service to which the signaling data is applied, mode information indicating a mode of the signaling data, version information indicating a version of the signaling data, and type information indicating type of the signaling data.

According to an embodiment, the service data may include media segments and application; and the SLS information may include MPD (Media Presentation Description) fragments including description information about the service data, S-TSID (Service-based Transport Session Instance Description) fragments including information about a transport session in which the service data are delivered, and USBD (User Service Bundle Description) including information referencing the MPD fragment and information referencing the S-TSID fragment.

According to an embodiment, when the service data and the SLS information are encoded based on the ROUTE protocol, information about an event for the service data may be transmitted through a first event message within the MDP fragment of the SLS information or through a second event message within the media segment of the service data.

According to an embodiment, the first and the second event message may each include at least one of information about presentation time of the event, information about duration of the event, and information about an identifier of the event.

According to an embodiment, presence of the second event message in the media segment may be signaled by InbandEventStream information in the MPD fragment of the SLS information.

According to an embodiment, information about a dynamic event for the service data may be transmitted via third event information in a video watermark, and the third event information may include at least one of information about presentation time of the dynamic event, information about duration of the dynamic event, and information about an identifier of the dynamic event.

Technical Effects

The present invention may process data according to service characteristics to control Quality of Services (QoS) for each service or service component, thereby providing various broadcast services.

The present invention may achieve transmission flexibility by transmitting various broadcast services through the same radio frequency (RF) signal bandwidth.

The present invention may provide a method and apparatus for transmitting/receiving a broadcast signal capable of receiving digital broadcast signals without an error even in the case of using a mobile reception device or in an indoor environment.

The present invention may support a next generation broadcast service efficiently in the environment that supports the hybrid broadcast that uses a terrestrial broadcast network and an internet network.

Hereinafter, the additional effects of the present invention may be described together with the construction of the invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 11 illustrates a protocol stack of a broadcast system according to one embodiment of the present invention.

FIG. 12 illustrates logical entities of service management, delivery, and physical layer and their relationship according to one embodiment of the present invention FIGS. 13A and 13B illustrate a structure of a transport frame delivered to the physical layer of the next-generation broadcast transport system according to one embodiment of the present invention.

FIG. 14 illustrates a structure of a transport frame delivered to the physical layer of the next generation broadcast transport system according to another embodiment of the present invention.

FIG. 15 illustrates a transport packet of an application layer transport protocol according to one embodiment of the present invention.

FIG. 16 illustrates a method for transmitting service signaling data according to one embodiment of the present invention.

FIG. 17 illustrates an EMT (Event Message Table) according to one embodiment of the present invention.

FIG. 18 illustrates AEI (Application Event Information) according to one embodiment of the present invention.

FIG. 19 illustrates an 'emsg (EventMessage)' box according to one embodiment of the present invention.

FIG. 20 illustrates an 'evti (Eventlnformation)' box according to one embodiment of the present invention.

FIG. 21 illustrates a dynamic event message according to one embodiment of the present invention.

FIG. 22 illustrates an update announcement event according to one embodiment of the present invention.

FIG. 23 illustrates SLT information according to one embodiment of the present invention.

FIG. 24 illustrates an XML format of the SLT according to an embodiment of the present invention.

FIG. 25(*a*) illustrates InetSigLocation information according to one embodiment of the present invention.

FIG. 25(*b*) illustrates an XML format of InetSigLocation information according to an embodiment of the present invention.

FIG. 26 illustrates the USBD according to one embodiment of the present invention.

FIG. 27 illustrates the USBD according to another embodiment of the present invention.

FIG. 28 illustrates a method for transmitting a broadcast signal according to an embodiment of the present invention.

FIG. 29 illustrates a broadcast signal transmitter and a broadcast signal receiver according to an embodiment of the present invention.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service.

This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an slang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @slpAddr attribute, an @dlpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @slpAddr attribute, the @dlpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID.

This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted.

The lbw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fulIMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUrl attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID.

That is, these fields may identify the transport session (MMTP session or the ROUTE session) carrying the above-described S-TS ID.

The @sTSIDMajorProtocol Version attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP_ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context_id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interleaver according to an embodiment of the present invention can be positioned between a BICM chain block and a frame builder.

Here, the time interleaver according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ (e1,i and e2,i) corresponding to a pair of constellation mapper outputs is fed to an input of a MIMO encoder and paired MIMO encoder output (g1,i and g2,i) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC_FLAG information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

Hereinafter, time interleaver is described. According to an embodiment of the present invention, each TI group is either mapped directly to one frame or spread over PI frames. Each TI group is also divided into more than one TI block (N_TI), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving at a receiver side.

Figure 9:
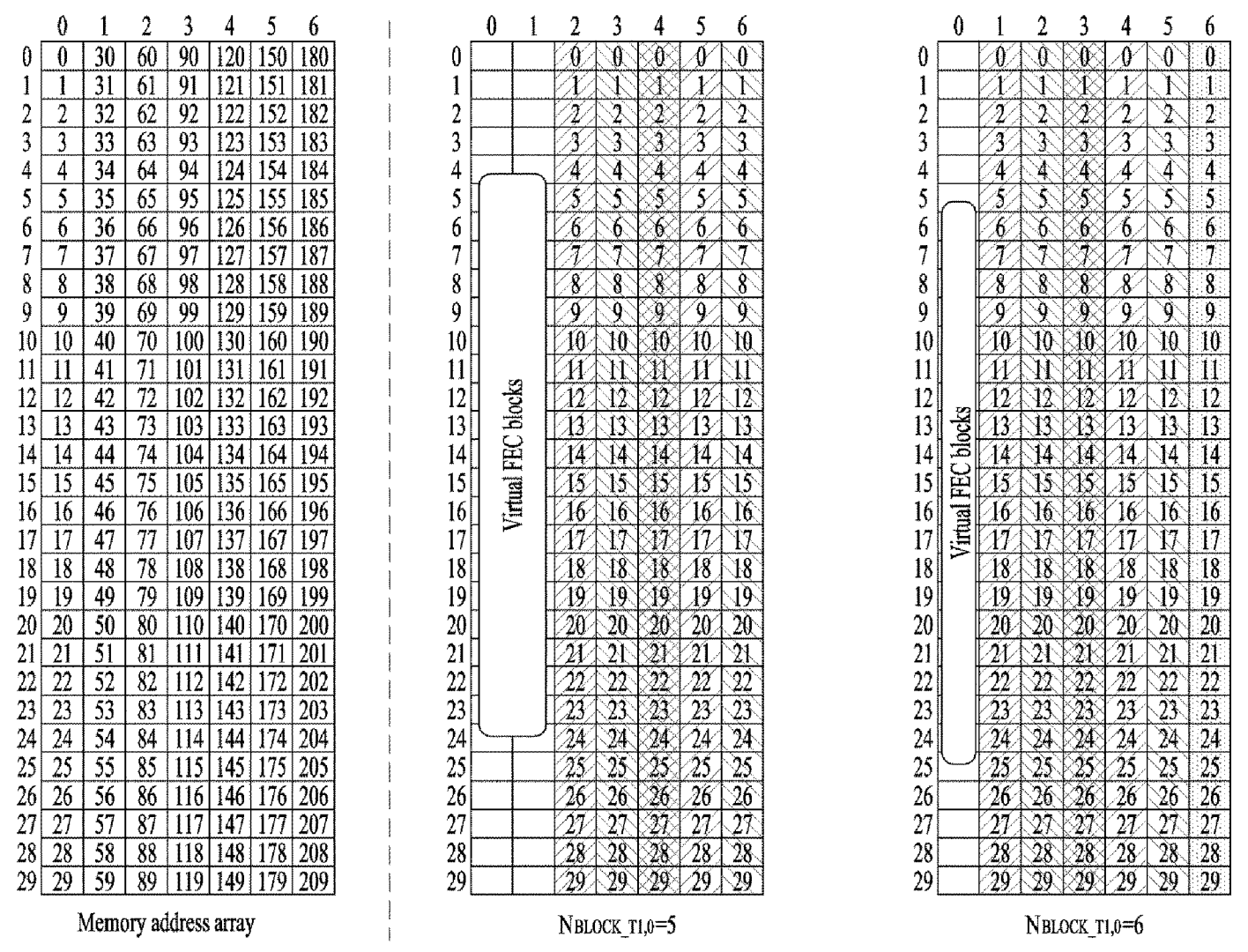

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $i^{th}$ OFDM symbol in the mth frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $Pro=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $P=0, \ldots, N_{data}-1$, for the first OFDM symbol of each pair, $v_{m,l,p}=x_{m,l,Hi(p)}$, $p=0, \ldots, N_{data}-1$ for the second OFDM symbol of each pair, where $H_1(p)$ is the interleaving address generated based on a PRBS generator and a cyclic shift value (symbol offset) of a sub-PRBS generator.

FIG. 11 illustrates a protocol stack of a broadcast system according to one embodiment of the present invention. FIG. 11 shows a conceptual model of a broadcast system according to one embodiment of the present invention. The same description of FIG. 11 as given with reference to FIG. 1 is omitted. In what follows, two methods for transmitting a broadcast service are defined.

The first method is based on the MPEG Media Transport (MMT) protocol, where a broadcast system may transmit an MPU (Media Processing Unit) by using the MMTP (MMT Protocol).

The MMT protocol may be used for transmission of broadcast program elements. Media Processing Units (MPUs) and MPEG DASH segments may be used respectively for transmission based on the MMT protocol and the ROUTE protocol; and media encapsulation and synchronization format. Non-Real Time (NRT) contents including NRT media, ESG (Electronic Service Guide) data, and miscellaneous files may be transmitted through the ROUTE protocol.

The second method is based on the MPEG DASH, where a broadcast system may transmit DASH segments by using the ROUTE (Real-time Object delivery over Unidirectional Transport) protocol.

The ROUTE protocol may be used for transmitting not only files and/or signaling metadata contained in a broadcast stream but also streaming media and/or non-realtime media. The fact that a service is transmitted over broadband indicates that one or more program components are transmitted over broadband rather than a broadcast network, where the DASH-IF profile of the MPEG DASH may be used over HTTP/TCP/IP in the case of broadband. Media files in the ISO Base Media File Format (BMFF) may be used for broadcast and/or delivery through broadband transmission, media encapsulation and/or synchronization format.

Signalling may be transmitted by using the MMT or ROUTE protocol, and bootstrap signaling information for obtaining the signaling transmitted through the MMT or ROUTE protocol may be provided through a service list table (SLT). As shown in the figure, an SLT may be transmitted from the UDP/IP layer. In this case, since the SLT is transmitted by being encapsulated by IP/UDP packets rather than being encoded in the delivery layer, a receiver may process the SLT more quickly, and therefore, a delay required for providing a service at the time of turning on the receiver or channel change may be reduced.

In this document, SLT may also be referred to as Fast Information Table (FIT) or Fast Information Channel (FIC). Also, MMT-specific signaling or ROUTE-specific signaling may be called service layer signaling (SLS). Here, SLS may refer to a signaling which provides information for discovery and acquisition of services and their content components, and SLT may refer to a table of signaling information which is used to build a basic service listing and provide bootstrap discovery of SLS.

FIG. 12 illustrates logical entities of service management, delivery, and physical layer and their relationship according to one embodiment of the present invention. In this document, an LCT session may also be called an LCT channel.

ROUTE/LCT sessions and/or MMTP sessions delivering content components of a broadcast service may be configured as follows. For the case of broadcast delivery of a linear service without app-based enhancement, a service content component may be delivered by at least one ROUTE/LCT session or one or more MMTP sessions. For the case of broadcast delivery of a linear service with app-based enhancement, a service content component may be delivered by at least one ROUTE/LCT session or zero or more MMTP sessions. Simultaneous use of the MMTP and the ROUTE session may be prohibited from being used for streaming of media components in the same service. With respect to the broadcast delivery of an app-based service, service content components may be delivered by at least one ROUTE/LCT session.

Each ROUTE session includes at least one LCT session delivering content components consisting of a broadcast service. With respect to the streaming service delivery, an LCT session may deliver individual components of a user service, such as audio, video, or caption streams. Streaming media may be formatted in units of DASH segments for each MPEG-DASH. Each MMTP session may include at least one MMTP packet flow delivering a content component or an MMT signaling. An MMTP packet flow may deliver a component formatted per MMT as MPUs or an MMT signaling message. Through the delivery of an NRT user service or system metadata, an LCT session may deliver a file-based content item. A content file may include continuous (time-based) or discrete (non-time based) media components of an NRT service or metadata such as service signaling or ESG fragments.

A broadcast stream may be defined by a carrier frequency at the center of a specific frequency band, as extraction of an RF channel. A PLP corresponds to a portion of an RF channel. Each PLP has specific modulation and coding parameters. A PLP may be distinguished by a PLP identifier (PLPID) unique in a broadcast stream to which the PLP belongs.

Each service may be distinguished by two different forms of a service identifier. One is a compact form used in the FIT/SLT, unique only in a broadcast area and the other is a globally unique form used in the SLS and ESG. A ROUTE session may be identified by a source IP address, destination IP address, and destination port number. An LCT session may be distinguished by a TSI (Transport Session Identifier) unique within the ROUTE session. Properties common to LCT sessions and certain properties unique to each LCT session may be provided via a ROUTE signaling structure called S-TSID (Service-based Transport Session Instance Description) which is a part of service level signaling. Each LCT session may be delivered by one PLP. Separate LCT sessions of a ROUTE session may belong to the respective PLPs different from each other. Characteristics described by the S-TSID may include a TSI value of each LCT session, PLPID, descriptor of delivery objects/files, and application layer FEC parameters.

An MMTP session may be identified by a source IP address, destination IP address, and destination port number. An MMTP packet flow may be identified by packet_id unique within the scope of a parent MMTP session. Properties common to MMTP packet flows and certain properties unique to each MMTP packet flow may be described in the SLT. Each MMTP packet flow may be delivered by one PLP. Different MMTP packet flows of an MMTP session may or may not be included in different PLPs. Characteristics described in an MMT signaling message may include PLP ID information and packet ID information about each MMTP packet flow.

FIG. 13 illustrates a structure of a transport frame delivered to the physical layer of the next-generation broadcast transport system according to one embodiment of the present invention.

The next-generation broadcast system may transmit a transport frame by using broadcast. As shown in FIGS. 13(a) and (b), P1 at the front part of the transport frame may indicate a symbol including information for transport signal detection. P1 may include tuning information, and a receiver may decode the L1 part located next to the P1 on the basis of the parameters included in the P1 symbol. A broadcast system may include information about transport frame configuration and properties of each DP (Data Pipe) in the L1 part. In other words, the receiver may obtain information about transport frame configuration and properties of each DP by decoding the L1 part. Also, the receiver may obtain information that needs to be shared among DPs through a common DP. According to the embodiment, the transport frame may not include the common DP.

Components such as audio, video, and data are transmitted by being included in an interleaved DP area of the transport framed, the interleaved DP area composed of DP1 to n. Here, a destination DP to which components constituting each service (channel) are transmitted may be signaled through L1 or common PLP.

Also, the next-generation broadcast system may transmit information for quickly obtaining information about a service included in a transport frame. In other words, the next-generation broadcast system may allow a next-generation broadcast receiver to quickly obtain a broadcast service included in a transport frame and contents-related information. Moreover, when the corresponding frame holds services/contents generated by one or more broadcast stations, the receiver may be made to efficiently recognize the service/contents for the corresponding broadcast station. In other words, the next-generation broadcast system may transmit service list information about a service included within a transport frame by including the service list information in the transport frame.

The broadcast system, to make the receiver quickly scan broadcast services and contents within the corresponding frequency band, may transmit broadcast service-related information through a separate channel such as Fast Information Channel (FIC) if exists. As shown in FIG. 13(b), the broadcast system may transmit a transport frame by including information for scanning and acquisition of broadcast services therein. Here, an area that includes information for scanning and acquisition of broadcast services may be called an FIC. The receiver may obtain information about broadcast services generated and transmitted from one or more broadcast stations through the FIC, by which the receiver may easily and quickly perform scanning of broadcast services that may be used in the receiver.

FIG. 14 illustrates a structure of a transport frame delivered to the physical layer of the next generation broadcast transport system according to another embodiment of the present invention.

Referring to FIG. 14, a specific DP included in a transport frame may operate as a basic DP capable of transmitting a signaling of a broadcast service and contents transmitted within the corresponding transport frame quickly and in a robust manner. Data transmitted through each DP of a transport frame of the physical layer may be processed as shown in FIG. 14. In other words, link layer signaling or IP datagram may be transmitted through a DP after they are encapsulated to generic packets of a specific form. Here, IP datagram may include signaling data. And link (low) layer signaling may include signaling related to fast service scan/acquisition, context information of IP header compression, and emergency alert.

FIG. 15 illustrates a transport packet of an application layer transport protocol according to one embodiment of the present invention.

The application layer transport session may consist of a combination of an IP address and a port number. When the application layer transport protocol is the ROUTE (Real-time Object delivery over Unidirectional Transport) protocol, the ROUTE session may consist of one or more LCT (Layered Coding Transport) sessions. For example, when one media component (for example, DASH Representation) is delivered through one LCT transport session, one or more media components may be multiplexed and transmitted through one application transport session. Furthermore, one or more transport objects may be transmitted through one LCT transport session, and each transport object may be a DASH segment associated with the DASH representation delivered through a transport session.

For example, when the application layer transport protocol is based on the LCT, a transport packet may be composed as follows. A transport packet may include an LCT header, ROUTE header, and payload header; and a plurality of fields included in the transport packet are as follows.

The LCT header may include the following fields. The V (version) field may represent version information of the corresponding transport protocol packet. The C field may represent a flag associated with the length of the Congestion Control Information field to be described below. The PSI field holds protocol-specific information and may represent information specific to the corresponding protocol. The S field may represent a flag associated with the length of the Transport Session Identifier (TSI) field. The O field may represent a flag associated with the length of the Transport Object Identifier (TOI) field. The H field may represent inclusion of a half-word (16 bits) in addition to the length of TSI and TOI field. The A (Close Session flag) field may represent termination of a session or imminence of termination of a session. The B (Close Object flag) field may represent termination of transmission of an object or imminence of transmission of an object. The Code point field may represent information related to encoding or decoding of payload of the corresponding packet. For example, payload type may correspond to the Code point field. The Congestion Control Information field may include information related to congestion control. For example, information related to congestion control may correspond to Current Time Slot Index (CTSI), channel number, or packet sequence number within the corresponding channel. The Transport Session Identifier field may represent an identifier of a transport session. The Transport Object Identifier field may represent an identifier of an object transmitted through the transport session.

The ROUTE (ALC) header may include additional information transmission of the preceding LCT header such as a payload identifier associated with a forward error correction scheme.

Payload data may represent a portion of actual data of the payload of the corresponding packet.

FIG. 16 illustrates a method for transmitting service signaling data according to one embodiment of the present invention.

An RF stream according to one embodiment of the present invention may include physical layer signaling information (PLS) and at least one PLP (Physical Layer Pipe). For example, a PLP may include a first PLP (PLP #0) transmitting an SLT, a second PLP (PLP #1) transmitting a service by using the ROUTE protocol and/or a third PLP (PLP #2) transmitting a service by using the MMT protocol. Service data and service layer signaling data (SLS) may be transmitted through the PLP. For example, service data may include video and/or audio data, and the format of service data may be based on segments or MPUs. The service layer signaling data for the ROUTE protocol may include S-TSID, USBD and/or MPD. The service layer signaling data for the MMT protocol may include USBD, MPD and/or MPT message.

The physical layer signaling data may include bootstrap information for obtaining the SLT. For example, the physical layer signaling data may include information about a PLP to which an SLT is transmitted, source_IP_address, destination_IP_address and/or destination_UDP_port.

The SLT may be transmitted through a specific PLP (PLP #0) and support a fast channel scan which enables a receiver to build a list of all of the services that may be received by the receiver by using a channel name or a channel number. Also, the SLT provides bootstrap information by which the receiver may discover an SLS for each service.

For example, the SLT may include a first service element for a first service (service #1) and a third service element for a third service (service #3).

The first service element may include protocol type information indicating the ROUTE protocol and first bootstrap information which allows an SLS for the first service to be discovered. The first bootstrap information may include PLP information (#1), source_IP_address information (#2), destination_IP_address information (#2) and/or destination_UDP_port information (#2). The receiver may obtain SLS for the first service on the basis of the first bootstrap information and obtain service data on the basis of the SLS.

The third service element may include protocol type information indicating the MMT protocol and the third bootstrap information which allows the SLS for the third service to be discovered. The third bootstrap information may include PLP information (#2), source_IP_address information (#3), destination_IP_address information (#3) and/or destination_UDP_port information (#3). The receiver may obtain the SLS for the third service on the basis of the third bootstrap information and obtain service data on the basis of the SLS.

In what follows, a signaling method (app signaling) is described with respect to a broadcast service related to an application (app) among the broadcast services described above.

Here, an application (app) may refer to a collection of documents (HTML, CSS, JavaScript, XML, multimedia files, and so on) consisting of an enhancement/interactive service. More specifically, an application (app) may be a downloaded collection of interrelated documents intended to run in a specific application environment (for example, an application environment specified in the ATSC 3.0 Runtime Environment) and perform one or more functions such as those providing interactivity or targeted ad insertion. Also, an application may access other data that are not part of the application itself.

At this time, a broadcast service related to an app may refer to a broadcast service when provision of a basic broadcast service is related to the application. More specifically, the broadcast service related to the app may include a linear service including app-based enhancements and/or app-based service. Depending on an embodiment, a signaling method to be described below may also be applied to a service of other type utilizing an app.

First, a linear service including app-based enhancements will be described. Here, a linear service may refer to an ordinary broadcast service. Enhancement may mean an enhancement service or an interactive service delivering additional information in association with an ordinary broadcast service. Also, an app-based enhancement may refer to a case in which provision/control of the additional information is performed on the basis of an application.

Next, an app-based service is described. An app-based service may refer to a broadcast service including only app-based enhancements. In other words, an app-based service may correspond to the case in which app-based enhancement does not provide additional information for a basic broadcast service but an app itself provides a service. More specifically, an app-based service may be a fully configured service with app-based features providing the user with an interface for the service. Here, app-based features may be a service component consisting of an application, optional fields to be used by the application, or optional notification directing the application to take a specific action at a particular time.

App-based enhancement may include several components. A component of an app-based enhancement may have one or more apps, zero or more activation notification, zero or more additional NRT content items and/or zero or more on-demand items.

Here, each app may be an NRT (Non-Real Time) content item, which may be executed in the application run time environment. Here, actions to be performed by apps may be initiated by notification delivered through a broadcast network/broadband, and the notification may correspond to the aforementioned activation notification. These notifications may also be called "events". Here, an additional NRT content item and/or on-demand item may refer to the data to be used by an app.

Here, a content item may refer to a set of one or more files that a service provider intends to treat as a single unit for presentation purposes.

Here, an event may refer to timed notification to receiver software or to an application indicating that some action is to be taken.

Here, an event stream may refer to a stream of the aforementioned events.

Here, an NRT content item may refer to a content item delivered ahead of time to be used for subsequent presentation or for other purposes in application. In this document, an NRT content item may also be called a locally cached content item.

Here, an on-demand content item may refer to a content item downloaded and presented at a time requested by the user. In this document, an on-demand content item may also be called a network content item.

In what follows, various types of app signaling methods will be described. First, a basic app signaling method (mechanism) is described, followed by the description of an app signaling method for a static event and an app signaling method for a dynamic event.

As described above, actions to be executed by apps may be initiated by notifications delivered through a broadcast network/broadband. These notifications may be called "events". Depending on the context, behavior, action, or state of the apps initiated by the notifications may also be called an event. Also, an executable action of an application may also be called an event. These events may be delivered over a broadcast network or broadband.

At this time, a static event for a broadcast service may be an event for which an action to be executed by an application is defined in advance, and a dynamic event for a broadcast service may be an event for which an action to be executed by an application is not predefined (for example, an event varying in real-time). In other words, a static event may refer to an event for which the timing is known well ahead of time, while a dynamic event may refer to an event for which the timing becomes known only at the last minute of the event. For example, a static event may be a predetermined event provided through an application from a broadcast service such as a drama, while a dynamic event may be an event varying in real-time, which is provided through an application from a broadcast service such as real-time sports broadcasting. In the case of a static event, a broadcast reciever may receive information about the static event before execution of the event while, in the case of a dynamic event, the broadcast reciever may receive information about the dynamic event in real-time.

Basic app signaling may be signaling to the application itself. For example, basic app signaling may be signaling about a list of applications which holds feature information of each application. In an embodiment, application features may be signaled through an AST (Application Signaling Table).

In an embodiment, an AST may include a plurality of instances for a plurality of app-based enhancements. Also, an AST may support the current/next version of an application. Also, an AST may support a "valid from" feature which represents from when an application is valid and a "valid until" feature which represents until when an application is valid.

In an embodiment, the AST may be delivered over a broadcast network or broadband.

When the AST is delivered through a broadcast network, the AST may be delivered through service layer signaling (SLS) for a broadcast service. In other words, the AST may be delivered by being included in the SLS information. At this time, a broadcast service may be the one to which the corresponding app enhancement is related.

When the AST is delivered through broadband, the AST may be obtained from a query. This query may be generated by using base URL information (Internet signaling URL) within the SLT. The base URL may correspond to URL information for obtaining the AST. At this time, the SLT may be the one including bootstrap information for a broadcast service related to the corresponding AST. Also, when the AST is delivered through broadband, asynchronous update or unexpected update may be signaled through a dynamic event. Also, the AST may support the current/next requests.

FIG. 17 illustrates an EMT (Event Message Table) according to one embodiment of the present invention. FIG. 18 illustrates AEI (Application Event Information) according to one embodiment of the present invention. In what follows, with reference to FIGS. 17 and 18, app signaling for a static event (static event signaling) will be described.

In one embodiment, when a static event is delivered through a broadcast network, a static event may be delivered in the form of a DASH event. At this time, a static event may be delivered in the form of an EventStream element appearing in a Period element of the MPD (DASH MPD Period).

Events delivered through an EventStream element may correspond to the events that have to be delivered to a receiver side during a time interval corresponding to a particular period. In other words, MPD is service signaling information for a particular service and may provide signaling information according to service time units called Period. The signaling information about the Period is included in the MPD Period element, where the Period element may include an EventStream element. The EventStream element may provide signaling (event) needed for the operation of applications of the corresponding service during the corresponding Period.

In another embodiment, in the case of a ROUTE/DASH delivery service, a static event may be signaled through an EMT (Event Message Table). An EMT may reference the Period element (DASH MPD/Period) in the MPD as a time base. An EMT may include a list of event streams which may have the same format as the EventStream in the MPD Period. The EMT may be delivered through a service signaling for a broadcast service or broadband. Here, a service signaling channel is a path through which an SLS is delivered; in the case of ROUTE, the service signaling channel may be a LCT session delivering an S-TSID, USBD/USD, MPD or all of them, and in the case of MMTP, the service signaling channel may be a packet flow delivering USBD/USD, MMT signaling messages or all of them.

Referring to FIG. 17, elements and attributes of the EMT according to one embodiment of the present invention are described as follows.

EMT: a set of static event streams mpdId element: an identifier of MPD used for a time reference PeriodId element: an identifier of Period used for a time reference EventStream element: an event stream @schemeIdURi attribute: an identifier scheme of an event stream. the string of which may use URN or URL syntax @value attribute: attribute of "value" of an identifier of the event stream @timescale: time scale used for the events within an event stream Event element: event and string data for the event. Contents of this element depend on event scheme (schemeIdURi) and value attributes. In other words, in an embodiment, @schemeIdURi and @value attributes may be used for identifying an event or type of the event.

@presentationTime attribute: presentation time of an event relative to the start time of the Period).

@duration attribute: duration of the corresponding event.

@id attribute: identifier of the corresponding event.

In a yet another embodiment, in the case of an MMT delivery service, a static event may be signaled through AEI (Application Events Information). AEI may reference the MPU (MMT Asset/MPU) in the MMT Asset as a time base. In the same way as the EMT, AEI may include a list of event streams what may have the same format as the event stream within the MPD Period. The AEI may be delivered through an MMT signaling session (service signaling channel) for a broadcast service or broadband.

Referring to FIG. 18, elements and attributes of the AEI according to one embodiment of the present invention are described as follows.

AEI: a set of static event streams

@assetId attribute: identifier of MPD used for a time reference

@mpuSeqNum attribute: identifier of the Period used for a time reference

EventStream element: an event stream

@schemeIdURi attribute: an identifier scheme of the event stream, the string of which may use URN or URL syntax.

@value attribute: attribute of "value" of an identifier of the event stream.

Event element: event and string data for the event. Contents of this element depend on event scheme and value attributes. In other words, in an embodiment, @schemeIdURi and @value attributes may be used for identifying an event or type of the event.

@presentationTime attribute: Presentation time of the event relative to the earliest presentation time of a first access unit in the MPU.

@duration attribute: duration of the corresponding event.

@id attribute: identifier of the corresponding event.

In the embodiments of FIGS. 17 and 18, the EMT and the AEI may include a "valid from" property which represents from when an event is valid and a "valid until" property which represents until when the event is valid. In the case of broadband delivery, asynchronous update is possible for the EMT and the AEI signaled through a dynamic event.

In this document, the EMT and the AEI may also be called app signaling information, event signaling information or static event signaling information.

FIG. 19 illustrates an 'emsg (EventMessage)' box according to one embodiment of the present invention. FIG. 20 illustrates an 'evti (EventInformation)' box according to one embodiment of the present invention. In what follows, with reference to FIGS. 19 and 20, app signaling (dynamic event signaling) for a dynamic event will be described.

Dynamic event signaling to be described below may also be used for a static event if necessary. In the present document, a dynamic event may be delivered through a broadcast network or broadband.

In one embodiment, in the case of ROUTE/DASH delivery service, a dynamic event may be signaled through an 'emsg' box. When an event is delivered in the form of the emsg box, the event is delivered in the form of an emsg box appearing in the Representation segments (ISO BMFF file). At this time, the InbandEventStream element of representation of the MPD may be used for signaling presence of an event in the emsg box within the segments. In other words, presence of an emsg box in the ISO BMFF file may be announced by the InbandEventStream element within the MPD.

Referring to FIG. 19, the emsg box may include scheme_id_uri field (information), value field (information), timescale field (information), presentation_time_delta field (information), event_duration field (information) and/or id field (information). Here, scheme_id_uri information, value information, timescale information, presentation_time_deltat information, event_duration information, and id information may correspond respectively to the @schemeIdURi attribute, @value attribute, @timescale attribute, @presentationTime attribute, @duration attribute, and @id attribute of the EMT described above. Therefore, unless otherwise specifically described, each information of the emsg may have the meaning substantially the same as the corresponding information of the EMT. However, presentation_time_delta information may refer to the presentation time of an event relative to the earliest presentation time within the corresponding segment.

The emsg box may further include message_data field (information). At this time, the message_data information may provide data required for executing an action initiated by the corresponding event.

In another embodiment, in the case of MMT delivery service, a dynamic event may be signaled through an 'evti' box. When an event is delivered in the form of the evti box, the event is delivered in the form of an evti box appearing in the MPUs (ISO BMFF file). At this time, a descriptor attached to the MPUs within the MPT may be used for signaling presence of an event in the evti box within the MPU. In other words, presence of an evti box within the ISO BMFF file may be announced by the descriptor within the MPT.

Referring to FIG. 20, the evti box may include scheme_id_uri field (information), value field (information), event_id field (information), presentation_time_delta field (information), and/or event_duration field (information). Here, scheme_id_uri information, value information, timescale information, presentation_time_deltat information, event_duration information, and id information may correspond respectively to the @schemeIdURi attribute, @value attribute, @id attribute, @presentationTime attribute, and @duration attribute of the AEI described above. Therefore, unless otherwise specifically described, each information of the evti may have the meaning actually the same as the corresponding information of the AEI.

The evti box may further include message_data field (information). At this time, the message_data information may provide data required for executing an action initiated by the corresponding event.

In the present document, the emsg box and the evti box may also be called app signaling information, event signaling information, or dynamic event signaling information.

According to the embodiment, a file (information) similar to the emsg and the evti box may be included in the Redistribution configuration. For example, signaling information similar to the emsg and the evti box may be transmitted via a video watermark. In other words, information about a dynamic event may be signaled through the video watermark. In another example, signaling information similar to the emsg and the evti box may be transmitted via the file announced (queried) by the query bit within an audio watermark.

FIG. 21 illustrates a dynamic event message according to one embodiment of the present invention. In particular, FIG. 21 illustrates an embodiment of a dynamic event message (information) for signaling a dynamic event through a video watermark.

As described above, signaling information (dynamic event message) for a dynamic event may be transmitted through a video watermark, which may be signaling information similar to the emsg and the evti box. Therefore, unless otherwise specifically described, each field (information) of the dynamic event message may have the meaning which is the same as or similar to the corresponding information of the emsg and the evti box.

Referring to FIG. 21, dynamic event message (information) may include schemeIdUri_field_size field, value_field_size field, data_field_length field, schemeIdUri field, value field, Timescale field, presentation_time field, duration field, id field and/or data field. According to the embodiment, the Timescale field may be omitted in the case of an MMT service. Also, dynamic event information may further include a reserved field for future use and/or delivery_protoco_type field indicating the delivery protocol for a service to which a dynamic event is applied.

Here, the schemeIdUri field, value field, Timescale field, presentation_time filed, duration field, id field and/or data field may substantially be the same information as the schemeIdUri information, value information, Timescale information, presentation_time information, duration information, id information and/or data information of the emsg and/or evti box described above. Also, the schemeIdUri_field_size field may represent the size of the schemeIdUri field, value_field_size field may represent the size of the value field, and the data_field_length field may represent the length of the data field.

FIG. 22 illustrates an update announcement event according to one embodiment of the present invention. In the embodiment of FIG. 22, an update announcement event (update event) is an event for announcing an update of a signaling table and may correspond to the static event or the dynamic event described above. However, the present invention is not limited to the description above, and the update announcement event may be a newly defined, special event.

In the embodiment of FIG. 22, information about an update announcement event may have the fields of the same format as the dynamic event message described above. At this time, the schemeIdUri field may have the value of "urn:atsc:3.0" or http://atsc.com/3.0; the value field may have the value of "tud" which represents a signaling table update; and the data field may have an integer value which specifies the "number of seconds of jitter" for allowing a table update request.

In what follows, an app signaling method and redistribution method with respect to the linear service having app-based enhancements will be summarized.

First of all, in the case of a linear service signaled through a broadcast network (Case #1), the AST which provides basic app signaling information may be transmitted through the ROUTE/DASH SLS or MMT signaling session. In the case of an event for the ROUTE/DASH service, 1) signaling information for a static event may be transmitted via the MPD Period StreamEvent element or via the EMT delivered by SLS, 2) signaling information for a dynamic event may be transmitted via the emsg box within the DASH segment (representation segment), and the emsg box may be announced (indicated) by the InBandEventStream within the representation. In the case of an event for the MMT service, 1) signaling information for a static event may be transmitted via the AEI delivered from the MMT signaling session and the AEI may reference the Asset/MPU as a time base; and 2) signaling information for a dynamic event may be transmitted via the evti box within the MPI.

Next, in the case of a linear service signaled through broadband (Case #1), the AST providing basic app signaling information may be delivered through a broadband query and used to determine the time to update "Valid until" data/time or a dynamic event. In the case of an event for the ROUTE/DASH service, the MDP may be delivered in the same manner as in the signaling through the broadcast network except for the EMT delivered through broadband and used to determine the time to update the "Valid until" data/time or a dynamic event. In the case of an event for the MMT service, except for the AEI delivered through broadband, the event may be delivered in the same manner as in the signaling through the broadcast network and used to determine the time to update "Valid until" date/time or a dynamic event.

Finally, a recovery file may provide the SLT for a current service except for the broadcast location information. Also, the recovery file may further provide timing reference information. The AST may be delivered through a broadband query. The static event delivered via the MPD/Period element or the EMT, "Valid until" date/time, or dynamic event may be used to update. When 1) or 2), the dynamic event may be delivered via at least one of 1) a dynamic event message in the video watermark, 2) a query to a dynamic event server when a query bit is set in the audio watermark, or 3) a web socket interface to a dynamic event server.

FIG. 23 illustrates SLT information according to one embodiment of the present invention.

SLT supports fast channel scan and service acquisition. SLT enables meaningful presentation of a service list to the user and includes information supporting service selection through channel up/down zapping. Also, SLT includes bootstrap information with which the location of a service layer signaling through broadcast/broadband may be found depending on availability of signaling. The bitstream syntax of the SLT is shown in FIG. 23. Descriptions of individual fields are as follows.

table_id: 8 bit unsigned integer. It may be configured to represent that the table is an SLT section.

SLT_section_version: 4 bit field. It may present the version number of the SLT section. The field may be increased by one if the contained information is changed. If the field value reaches the maximum value of '1111', the field value may be reset to 0.

SLT_section_length: This 12 bit field may represent the number of bytes of an instance of the SLT section. The specified length may start right after the SLT_section_length field.

SLT_protocol_version: 8 bit unsigned integer. It represents the version of the SLT structure. The upper four bits of this field may represent a major version and the lower four bits may represent a minor version. In an embodiment, the value of this field may be set to 0x10 to represent the version 1.0.

broadcast_stream_id: 16 bit unsigned integer. It may be used to identify the entire broadcast streams. The uniqueness of a field value may be given by the span of a geographic region (for example, north America).

SLT_section_number: 4 bit unsigned integer. It starts from 0 and may represent the section number. The SLT may include multiple LST sections.

last SLT_section_number: represents the section with the highest SLT_section_number of the SLT including the current SLT section as one element thereof. For example, if the last_SLT_section_number field has a value of '0010', it may represent that the SLT has a total of three sections labelled with '0000', '0001', and '0010'.

num_services: 8 bit unsigned integer. It may represent the number of services described in the service_list_table_section( ).

service_id: 16 bit unsigned integer identifying the corresponding service uniquely within the scope of a broadcast region.

In an additional embodiment, service_id attribute (information) may be string type (URI string). In other words, service_id of the SLT is a URI type, which may be an identifier of arbitrary URI type used to identify the corresponding service in a unique manner within the scope of a broadcast region. In this case, USBD may include only the service ID information (URI type) of a single type, which is the same type as the service ID information of the SLT, instead of using the service ID information of two different types (URI type and 16-bit integer type).

SLT_service_seq_number: represents a sequence number of service information having a service ID which is the same as the service_id field within the "for" loop block. SLT_service_seq_number field starts from 0 for each service and may be increased by one when SLT service information for a service identified by the service_id is changed. When the SLT service information for a specific service does not change compared with the previous service information having a specific value of the SLT_service_seq_number, the SLT_service_seq_number field value is not increased. The SLT_service_seq_number field value is reset to 0 when it reaches the maximum value.

protected: 1 bit flag. If it is set to '1', it represents that at least one component required for meaningful presentation may be protected. If it is set to '0', this flag may represent that a component required for meaningful presentation of a service may not be protected.

major_channel_number: 10 bit unsigned integer which ranges from 1 to 999. It represents a "major" channel number of a service defined within the "for" loop block. Each service may be related to a major_channel_number and a minor channel number. Like the minor channel number, the major_channel_number may function as a reference number of a user for a virtual channel. The major channel number is set so that a pair of the major/minor channel number does not overlap the other pairs within the SLT.

minor_channel_number: 10 bit unsigned integer which ranges from 1 to 999. It represents a "minor" or "sub" channel number of a service defined within the "for" look block. This field provides channel numbers of two parts of the service together with the major_channel_number field, and the minor_channel_number represents the second number or the number on the right-hand side.

service_category: 4 bit unsigned integer field. This field may represent a service category as shown in Table 1.

TABLE 1

| Service Category | Meaning |
| --- | --- |
| 0x00 | Not specified |
| 0x01 | Linear A/V service |

TABLE 1-continued

| Service Category | Meaning |
| --- | --- |
| 0x02 | Linear audio only service |
| 0x03 | App-based service |
| 0x04~0x0f | Reserved for future use | short_service_name_length: 4 bit unsigned integer. It represents the length of the subsequent short_service_name( ) field in units of bytes. When no short name is given for this service, this field may be set to 0.

short_service_name( ): When this field exists, it represents a short name of the service. Each character of the short name may be encoded in UTF-8 format.

broadcast_signaling_present: 1 bit Boolean flag. If this flag is set to '1', it indicates existence of fields which start from the SLS_PLP_ID field of the table of FIG. 23 and end at the fields related to the num_ext_length_bits. If this flag is set to '0', it indicates that these fields do not exist in the corresponding 'for' loop block.

broadband_access_required: 1 bit Boolean flag. If this flag is set to '1', it may indicate that a broadband access is needed for a receiver to provide meaningful presentation of a service identified by the service ID. If this flag is set to '0', it indicates that a broadband access is not required to provide meaningful presentation of a service identified by the service ID.

SLS_source_IP_address_present: 1 bit Boolean flag. If this flag is set to '1', it indicates existence of the SLS_source_IP_address field. If the field value is '0', it indicates that there is no SLS_source_IP_address field in the corresponding "for" loop block.

hidden: 1 bit field. This field is set to '1' if a service is intended to be used for testing or proprietary purposes and is not selected by an ordinary TV receiver whereas this field may have a value of '0' if the service is targeted to ordinary TV receivers.

SLS_protocol_type: 4 bit unsigned integer. It represents a protocol type of the SLS channel on the UDP/IP for the service described in the "for" loop block. This bit may be coded as shown in Table 2. A receiver may parse the data field part, and when the SLS_protocol_type is unknown or unsupported, the service may be ignored. Table 2 illustrates an embodiment of code values of the SLS protocol type information.

TABLE 2

| SLS protocol type | Meaning |
| --- | --- |
| 0x00 | Reserved |
| 0x01 | ROUTE |
| 0x02 | MMTP |
| 0x03~0x0F | Reserved for future use |

SLS_PLP_ID: 8 bit unsigned integer field. This field represents the ID of the PLP including SLS data for the service. The PLP may be more robust than other PLPs used by the service.

SLS_destination_IP_address: represents the 32 bit IPv4 destination IP address of the SLS channel for the service.

SLS_destination_UDP_port: represents a destination UDP port number of the SLS channel for the service.

SLS_source_IP_address: when this field exists, it represents a source IPv4 address related to the SLS for the service.

SLS_protocol_version: 8 bit unsigned integer field. This field may represent the version of the protocol identified by the SLS protocol type field which may be used for providing SLS for the service. The meaning of the SLS protocol version information may depend on the employed protocol (for example, the value of the SLS protocol type information). When the value of the SLS_protocol_type field is 0x01, namely when the value indicates the ROUTE protocol, the MSB 4 bits of the SLS_protocol_version field may represent the major protocol version of the ROUTE protocol, and the LSB 4 bits may represent the minor protocol version of the ROUTE protocol. As an example, in the case of the ROUTE protocol, the major version number may be 0x1, and the minor version number may be 0x0. When the value of the SLS_protocol_type field is 0x02, namely when the value indicates the MMT protocol, the MSB 4 bits of the SLS_protocol_version field may represent the major protocol version of the MMT protocol, and the LSB 4 bits may represent the minor protocol version of the MMT protocol. As an example, in the case of the MMT protocol, the major version number may be 0x1, and the minor version number may be 0x0.

Receivers may not provide those user services labeled with a major protocol version higher than that supported by the receivers. Also, by default, the receiver may not provide the user with a service of the minor protocol version. The receiver may determine by using the minor protocol version whether transmitted data include data elements defined in the latest version of the standard.

num_ext_length_bits: 4 bit unsigned integer ranging from 0 to 12. It may represent the length of the ext_length field in bit units. A value of '0000' may represent that reserved1, ext_length, and reserved2 field do not exist in the corresponding iterations of the "for" loop block.

reserved1: a length field of (8-num_ext_length_bits %8) bits. This field may have each bit equivalent to 1. The % operator returns the integer remainder after dividing its first operand by its second operand. If (num_ext_length_bits %8) is 0, the reserved1 field may not exist in the corresponding iterations of the "for" loop block. This field may be reserved for future use.

ext_length field: unsigned integer having the length of num_ext_length_bits. This field may represent the length of the reserved2( ) data (in units of bytes) right next to the corresponding field.

reserved2( ): a protocol extension field the length of which is 8*ext_length bits. This field may have an arbitrary value. This field may be reserved for future use.

num_service_level_descriptors: represents the number of zero or more descriptors which provide additional information for a service. A four-bit unsigned integer field may represent the number of service level descriptors for the service. When the field value is 0, it indicates that there is no descriptor.

service_level_descriptor( ): the format of each descriptor may by an 8 bit type field and may be followed by an 8 bit length field. The length field may represent the number of bytes of the succeeding data of the length field.

num_SLT_level_descriptors: represents the number of zero or more descriptors providing additional information for the SLT. The four-bit unsigned integer field may represent the number of SLT level descriptors included in the service_list_table_section( ). When the field value is 0, it indicates there is no descriptor.

SLT_level_descriptor( ): the format of each descriptor may be an 8 bit type field and may be followed by an 8 bit length field. The length field may represent the number of bytes of the succeeding data of the length field.

Zero or more descriptors may provide additional information for a set of services delivered by a specific service or SLT instance. The SLT descriptor may include a descriptor tag which may represent at least one of a descriptor to be defined, reference, or location within the SLT. A specific descriptor may have to be defined for a particular situation. For example, descriptors such as inet_signaling_location_descriptor( ), service_language_descriptor( ), and capabilities_descriptor( ) may be included between the service level and the SLT level. Among the descriptors, the descriptor of inet_signaling_location_descriptor( ) will be described in detail with reference to FIG. 25.

Reserved3: SLT extension data bytes (N). This field may have an arbitrary value. This field may be reserved for future use.

The SLT described above may be signaled in the XML format.

FIG. 24 illustrates an XML format of the SLT according to an embodiment of the present invention. Those descriptions of FIG. 24 related to FIGS. 3 and 23 will not be repeated. In the embodiment of FIG. 23, the InetSigLocation element at the level of the SLT element may correspond to the sltInetUri element of FIG. 3, and the InetSigLocation element at the level of the Service element may correspond to the SvcInetUrl element of FIG. 3. Also, the embodiment of FIG. 24 may include a hidden field (element) in the same manner as in the embodiment of FIG. 14.

FIG. 25(a) illustrates InetSigLocation information according to one embodiment of the present invention. More specifically, FIG. 25(a) illustrates bit stream syntax of InetSigLocation information (Internet Signaling Location Descriptor). Those descriptions of FIG. 25(a) related to FIG. 3 will not be repeated.

Referring to FIG. 25(a), InetSigLocation information may include a descriptor field, descriptor_length field, URL_type field and/or URL_bytes( ) field. Descriptions of the individual fields are given as follows.

descriptor_tag: 8 bit unsigned integer. inet_signaling_locatino_descriptor( ) may have a value identifying this descriptor.

descriptor_length: 8 bit unsigned integer. This field represents the length (in bytes) immediately following this field up to the end of this descriptor.

URL_type: 8 bit unsigned integer. This field represents the type of a URL. In one embodiment, the URL type may be a URL of a signaling server or a URL of an ESG server. Here, the signaling server may be a server providing access to the signaling information (for example, service layer signaling), and the ESG server may be a server providing access to the ESG data. In another embodiment, the URL type may be a URL of a Service Usage Data Gathering Report server, which may be used for service usage reporting.

The URL type field holds a URL type value and represents the type of a URL. In an embodiment, the URL type may have code values as shown in Table 3.

TABLE 3

| urlType | Meaning |
| --- | --- |
| 0x00 | URL to Signaling server |
| 0x01 | URL to ESG server |

TABLE 3-continued

| urlType | Meaning |
| --- | --- |
| 0x02 | URL to usage reporting |
| 0x03 | URL to Dynamic Events Server (for the redistribution case only) |
| 0x04~0xFF | Reserved for future use |

Referring to Table 3, when the URL type is "0x00(0)", it may represent a URL of the signaling server; when the URL type is "0x01(1)", it may represent a URL of the signaling server; when the URL type is "0x02(2)", it may represent a URL about usage reporting; when the URL type is "0x03(3)", it may represent a URL of a dynamic event server. At this time, the URL of the dynamic event server may be used only for the case of redistribution.

Table 3 is only an example illustrating URL types, and URL types are not limited to the example given above. For example, the URL type value '0x00' may also be assigned as a reserved value for future use, and in this case, the values of '0x01', '0x02', and '0x03' may represent the URL of the signaling server, the URL of the ESG server, and the URL of the usage reporting server, respectively. Also, the URL of the dynamic event server may be substituted for by the URL of the signaling server.

URL_bytes( ) each character of the URL may be encoded in UTF-8 format. In the case of a URL of the signaling server, the base URL may be extended by a query term to specify a requested resource(s). In the case of a RUL of the ESG server, the URL may be used specifically for ESG broadband delivery. In this document, the query term may be called a path term or HTTP message body, which will be described in detail with reference to FIG. 25.

The InetSigLocation information may be signaled in the XML format.

FIG. 25(b) illustrates an XML format of InetSigLocation information according to an embodiment of the present invention. Those descriptions of FIG. 25(b) related to FIGS. 3 and 25(a) will not be repeated.

FIG. 25(b) illustrates the InetSigLoc element defined in the SLT. The InetSigLoc element (information) may also be called InetSigLocation element or InetSigLocation information. As described above, the InetSigLoc element at the level of the SLT element may correspond to the sltInetUrl element of FIG. 3, and the InetSigLoc element at the level of the Service element may correspond to the SvcInetUrl element of FIG. 3.

If available, the InetSigLoc element may provide a URL for signaling through broadband or accessing announcement information. The URL type of this element may be an extension of anyURL data type, which adds @urlType attribute. In what follows, each field will be described.

The InetSigLoc element may provide a URL at which a receiver may obtain data from a remote server through broadband. @urlType attribute may indicate the type of data that may be accessed through the URL. @urlType attribute may represent the type of a URL by using the URL type value, descriptions of which are the same as given above.

When the URL type of the InetSigLoc element within the SLT is a URL of the signaling server, the corresponding URL (base URL) may be used for generating an HTTP request for signaling metadata. To handle the request, a POST method (or GET method) may be used, and the message body (HTTP POST message body) may include an object of contents type "application/x-www-form-urlencoded". The message body may include a list of name-value pairs which have the equal sign (=) between the name and the value; and the ampersand sign (&) used as a separator between pairs.

Table 4 shows one embodiment of possible names and values.

TABLE 4

| Name | Values |
| --- | --- |
| Service | <service_id> |
| Mode | normal\|diff\|template |
| Version | current\|next |
| Type | ALL\|RD\|USBD\|STSID\|MPD\|MMT\|MPT\|AST\|EMT |

Table 4 illustrates an example of the HTTP POST message body. Referring to Table 4, the HTTP POST message body may include a service term, mode term, version term and/or type term.

When the InetSigLoc element is at the section level (or SLT level), the service term may be used for designating a service to which a requested signaling metadata object is applied, after which a signaling metadata object for all of the services within the section (or SLT) may be requested. When the InetSigLog element is at the service level, the service term may not be needed to designate the requested service.

The mode term may indicate whether a normal form of metadata object(s), a diff form of the metadata object(s), or template form of the metadata object(s) has been requested.

The version term may indicate whether the current version of the metadata object(s) or the next version of the metadata object(s) have been requested.

The type term may be used to indicate whether the type of a metadata object(s) has been requested. One embodiment of supported types is listed in Table 5 below.

TABLE 5

| Name | Values |
| --- | --- |
| ALL | All metadata objects for requested service(s) |
| RD | All ROUTE/DASH metadata objects for requested service(s) |
| USBD | USBD for requested service(s) |
| STSID | S-TSID for requested service(s) |
| MPD | DASH MPD for requested service(s) |
| MMT | All MMT metadata objects for requested service(s) |
| PAT | Package Access Table for requested service(s) |
| MPT | MMT Package Table for requested service(s) |
| MPIT | Media Presentation Information Table for requested service(s) |
| CRIT | Clock Relation Information Table for requested service(s) |
| DCIT | Device Capabilities Information Table for requested service(s) |
| AST | Application Signaling Table for requested service(s) |
| EMT | Event Messages Table for requested service(s) |

In one embodiment, the requested type of an object may further include an additional type. For example, the requested type may further include the AEI for a requested service(s).

An example of the body of an HTTP request for the signaling metadata is as follows.

service=0x2107&mode=normal&version=current&type=RD

In an embodiment, the HTTP request body may be appended to the front or back of the base URL to generate an HTTP request for the signaling metadata.

A response body for the HTTP POST request may have multi-part encapsulation for a discovered metadata object.

When the URL type of the InetSigLoc element is a URL of the ESG server, the URL information may be used for discovering ESG data through broadband. If the InetSigLoc element is a child element of the service element, the URL may be used for discovering ESG data for a service. If the InetSigLoc element is a child element of the service element, the UTL may be used for discovering ESG data for all of the services within the section.

In the present document, the HTTP POST message body may also be called a query term or a path term.

FIG. 26 illustrates the USBD according to one embodiment of the present invention.

In the embodiment of FIG. 26, USBD is delivered according to the ROUTE protocol as in FIG. 4. Those descriptions of FIG. 26 related to FIG. 4 will not be repeated.

The @serviceId attribute and @atsc:serviceId of FIG. 26 may correspond to @globalServiceID attribute and @serviceId attribute of FIG. 4, respectively.

In the embodiment of FIG. 26, USBD may include @serviceStatus attribute. The @serviceStatus attribute may be either in the active or inactive state, representing the attribute of the corresponding service.

Also, in the embodiment of FIG. 26, USBD may include @atsc:fullMPDUri attribute and @atsc:sTSIDUri attribute. Here, @atsc:fullMPDUri attribute may reference an MPD fragment which includes a description about the contents component of a service delivered through a broadband network or broadband, and the @atsc:fullMPDUri attribute corresponds to the @fullMPDUri attribute of FIG. 4 described above. Here, @atsc:sTSIDUri attribute may reference the S-TSID fragment which provides parameters related to accessing a transport session delivering a service, and the @atsc:sTSIDUri attribute corresponds to the @sTSIDUri attribute of FIG. 4.

FIG. 27 illustrates the USBD according to another embodiment of the present invention.

In particular, FIG. 27 illustrates USBD of the MMT SLS for a component delivered through a different delivery path. Those descriptions of FIG. 27 related to FIGS. 4, 5, and 26 will not be repeated.

Referring to FIG. 27, USBD of the MMT may include information representing the version of the SLS protocol. In one embodiment, USBD may include @slsMajorProtocolVersion attribute and @slsMinorProtocolVersion attribute within the atsc:routeComponent element. In another embodiment, USBD may include @slsMajorProtocolVersion attribute and @slsMinorProtocolVersion attribute within the atsc:broadbandComponent element.

At this time, @slsMajorProtocolVersion attribute may represent the major version number of the protocol used for delivering SLS for the corresponding service, the default value of which may be 1. The @slsMinorProtocolVersion attribute may represent the minor version number of the protocol used for delivering SLS for the corresponding service, the default value of which may be 1.

In this document, atsc:routeComponent element may also be called a routeComponent element or routeComponent information; and atsc:broadbandComponent element may also be called a broadbandComponent element or broadbandComponent. Also, @slsMajorProtocolVesion attribute may also be called @sTSIDMajorProtocolVersion attribute or sTSIDMajorProtocolVersion information; and @slsMinorProtocolVersion attribute may also be called @sTSIDMinorProtocolVersion attribute or sTSIDMinorProtocolVersion information.

The USBD used in the MMT may include a component signaling for a component transmitted through a different delivery path rather than the MMTP. For example, the USBD may include atsc:routeComponent element providing a description about a contents component of a service delivered according to the ROUTE protocol and atsc:broadbandComponent element providing a description about a contents component of a service delivered through broadband.

Reception of SLS is required for signaling transmission of a component described by the atsc:routeComponent element or atsc:broadbandComponent element. For example, reception of S-TSID is needed for a route component while reception of full MPD is needed for a broadband component. Since each SLS provides information describing at which location each component is received, it is sufficient for the USBD to describe only information about which URI each SLS is transmitted to (sTSIDUri information or fullMPDUri information) and the information about slsMajorProtocolVersion and slsMinorProtocolVersion described above.

FIG. 28 illustrates a method for transmitting a broadcast signal according to an embodiment of the present invention.

A broadcast transmitter may generate service data (broadcast service data) for a broadcast service and service layer signaling (SLS) information for the service data S28010. A broadcast service may be a linear service or app-based service. A linear service may be a linear service having app-based enhancements (features) or a linear service which does not have app-based enhancements. Service data support a function provided by a broadcast service, which, for example, may include at least one of media segments (audio segments, video segments, and so on) and applications (apps). In an embodiment, SLS information may be signaling information including information for discovery and acquisition of broadcast service data. SLS information may also be called service layer signaling or first level signaling. In an embodiment, SLS information may include an MPD (Media Presentation Description) fragment including description information about service data, S-TSID (Service-based Transport Session Instance Description) fragment including information about a transport session through which service data are delivered, and USBD (User Service Bundle Description) including information referencing the MPD fragment and information referencing the S-TSID fragment.

The broadcast transmitter may encode service data and SLS information based on a delivery protocol S28020. The delivery protocol according to which service data and SLS information are delivered may be ROUTE (Real-Time Object Delivery over Unidirectional Transport) protocol or MMT (MPEG Media Transport) protocol. Meanwhile, the broadcast service data and SLS information may encode the same delivery protocol. In other words, when broadcast service data are encoded based on the MMT protocol, SLS information for the broadcast service data may be encoded based on the MMT protocol. Also, when broadcast service data are encoded based on the ROUTE protocol, SLS information for the broadcast service may be encoded based on the ROUTE protocol.

The broadcast transmitter may generate service list table (SLT) information for service data S28030. Here, SLT information is signaling information for discovery of SLS information and building a basic service list, which may include bootstrap information for discovering SLS information.

For example, SLT may include first bootstrap information for discovery of SLS information delivered according to the ROUTE protocol, and the first bootstrap information may include PLP information about the SLS information, source_IP_address information, destination_IP_address information and/or destination_UDP_port information. As another example, SLT may include second bootstrap information for discovery of SLS information delivered according to the MMT protocol, and the second bootstrap information may include PLP information about the SLS information, source_IP_address information, destination_IP_address information and/or destination_UDP_port information. In this case, a receiver may obtain SLS for a broadcast service on the basis of the first bootstrap information and obtain service data on the basis of the SLS.

SLT information may also be called low level signaling or second level signaling.

The broadcast transmitter may generate a signal frame by physical layer processing of service data, SLS information, and SLT information S28040.

In an embodiment, SLT information may further include URL information about a URL (Uniform Resource Locator) for obtaining signaling data or ESG (Electronic Service Guide) data through broadband and URL type information indicating the type of data available through the URL. In an embodiment, the URL indicated by the URL type information may be one of a URL of the signaling server for signaling data or a URL of the ESG service for ESG data.

In an embodiment, URL information may include signaling data for all of the services in the SLT information; first level URL information for obtaining the ESG data and signaling data for one specific service in the SLT information; or second level URL information for obtaining the ESG data. At this time, the first level URL information is the URL information at the SLT element level (or SLT section element level), which may be called sltlnetUrl information. Also, the second level URL information is the URL information at the Service element level, which may be called syslnetUrl information. As described above, the SLT includes URL information at two different levels, thereby signaling URL information for obtaining signaling data hierarchically and improving efficiency.

In an embodiment, when the URL indicated by the URL type information is a URL of the signaling server, the URL information may be used to generate an HTTP request message for the signaling data together with one or more additional information, and one or more additional information may include at least one of service information indicating the service to which the signaling data are applied, mode information indicating the mode of the signaling data, version information indicating the version of the signaling data, and type information indicating the type of the signaling data. Here, one or more additional information elements may also be called a path term or a query term.

In an embodiment, service data may include media segments and applications (apps). For example, service data may be a linear service (a linear video/audio service or a service consisting of only linear audio) having app-based enhancements (features). Here, the media segment may be an audio or video segment and may also be called a DASH segment or representation segment. In this case, a broadcast transmitter may generate information for signaling an application (app signaling information) and transmit the generated information.

In an embodiment, when service data and SLS information are encoded according to the ROUTE protocol, information about an event for the service data may be transmitted through a first event message within the MDP fragment of the SLS information or through a second event message within the media segment of the service data. In this case, the first and the second event message may each include at least one of information about presentation time of the event, information about duration of the event, and information about an identifier of the event.

Here, as described above, the event may be a notification delivered through a broadcast network or broadband for initiating an action to be taken by an application. In an embodiment, an event may be a static event or a dynamic event. Here, as described above, a static event is such kind of event of which the action to be executed by an application is predetermined. In other words, a static event may be an event of which the timing is known well ahead of time. Here, as described above, a dynamic event may be an event of which the action is not predetermined (for example, an event about a service varying in real-time). In other words, a dynamic event may be an event the timing of which is known only at the last moment.

In an embodiment, a static event for the service data (broadcast service) may be transmitted through the first event message (information) within the MDP (Media Presentation Description) fragment of the SLS information while a dynamic event for a broadcast service may be transmitted through the second event message (information) within the media segment of the media data. In other words, a static event for the ROUTE service may be transmitted through the first event information within the MDP (Media Presentation Description) fragment of the SLS information while a dynamic event for the ROUTE service may be transmitted through the second event information within the media segment of the media data.

In this case, the first event information may be signaled through the Eventstream element within the Period element of the MPD fragment, and the fields included in the first event information may be the same as the fields included in the EMT information. For example, the first event information may include at least one of information about presentation time of a static event, information about duration of the static event, and information about an identifier of the static event. Also, the first event information may further include the schemeIdUri information, value information and/or timescale information.

Also, the second event information may be the emsg box within the representation segment (DASH segment), and the fields included in the first event information may be the same as the fields included in the EMT information. For example, the second event information may include at least one of information about presentation time of a dynamic event, information about duration of the dynamic event, and information about an identifier of the dynamic event. Also, the second event information may further include the schemeIdUri information and/or value information.

In an embodiment, existence of the second event within the media segment may be signaled by the information within the MPD fragment of the SLS information. For example, the information may be InbandEventStream element (information) within the representation of the MPD described above.

In an embodiment, a dynamic event for a broadcast service may be transmitted through a third event message (information) within a video watermark. Here, the fields included in the fourth event information may be the same as the fields included in the EMT information. For example, the third event information may include at least one of information about presentation time of a dynamic event, information about duration of the dynamic event, and information about an identifier of the dynamic event. The third event information may also be called the dynamic event message.

FIG. 29 illustrates a broadcast signal transmitter and a broadcast signal receiver according to an embodiment of the present invention.

The broadcast signal transmitter 29100 may include a signaling generator 29110, delivery layer encoder 29120, and physical layer processor 29130.

The signaling generator 29110 may generate service layer signaling (SLS) information for service data for a broadcast service and service list table (SLT) information for the service data.

The delivery layer encoder 29120 may encode the service data and the SLS information according to a delivery protocol. In an embodiment, the delivery protocol may include at least one of the ROUTE (Real-Time Object Delivery over Unidirectional Transport) protocol or MMT (MPEG Media Transport) protocol.

The physical layer processor 29130 may generate a signal frame by physical layer processing of the service data, SLS information, and SLT information.

The broadcast signal transmitter 29100 of FIG. 29 performs the method for transmitting a broadcast signal, and the same descriptions will not be repeated.

The broadcast signal receiver 29200 may include a signaling parser 29210, delivery layer decoder 29220, and physical layer parser 29230. The broadcast signal receiver 29200 may perform an inverse operation of the broadcast signal transmitter.

The physical layer parser 29230 may perform physical layer processing on a received signal frame and output a UDP/IP packet stream including service component data. The delivery layer decoder 29220 may decode the service component data according to a delivery protocol. The signaling parser 29120 may obtain and parse signaling information and control the operation of the broadcast signal receiver. For example, the broadcast signal receiver may obtain the SLT and parse the SLT to obtain the IP address and port number of a required SLS. And the broadcast signal receiver may parse the SLS and obtain a transport path of required service data. And the broadcast signal receiver may provide the corresponding broadcast service to the user by physical layer parsing and delivery layer decoding of required broadcast data over the entire path.

In FIG. 29, sub-units of the broadcast signal transmitter and the broadcast signal receiver are divided according to their operation. In other words, one sub-unit does not necessarily have to be implemented as one physical processor; one sub-unit may be implemented as a plurality of physical processors, or a plurality of sub-units may be implemented as one physical processor.

The individual steps described in the embodiments above may be performed by hardware/processors. Each module/block/unit described in the embodiments above may operate as hardware/processor. Also, the methods according to the present invention may be performed as program codes. These codes may be written to a processor-readable storage medium and therefore, may be read by a processor provided by the apparatus.

For the convenience of description, the present invention has been described according to the respective drawings; however, it is equally possible to design a new embodiment by merging the embodiments described in the respective drawings. The apparatus and methods according to the present invention are not limited to the embodiments described above, but all or part of the embodiments may be combined selectively so that various modifications may be made to the embodiments.

Meanwhile, the method according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

It is apparent for those skilled in the art that the present invention may be embodied with various changes and modifications without departing from the technical principles and scope. Therefore, it should be understood that the present invention includes changes and modifications of the present invention provided within the technical scope defined by the appended claims and within an equivalent scope of the claims.

The present document describes both of the product invention and the process invention, and descriptions of the respective inventions may be applied in a supplementary manner.

MODE FOR INVENTION

Various embodiments have been described in the Best Mode for the Invention.

INDUSTRIAL APPLICABILITY

The present invention is used in a series of broadcast signal transmission/reception fields.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

The invention claimed is:

1. A digital receiver of processing multiple events received via hybrid networks, the digital receiver comprising:
   a tuner configured to receive a RF stream comprising SLT (Service List Table); and
   a control engine configured to:
   obtain first signaling information for a ROUTE (Real-time Object Delivery over Unidirectional Transport)/DASH (Dynamic Adaptive Streaming over HTTP) service based on source IP address information, first destination IP address information and first destination port information included in the SLT,
   obtain second signaling information for a MMT (MPEG Media Transport) service based on second destination IP address information and second destination port information included in the SLT, wherein a first PLP (Physical Layer Pipe) for the SLT, a second PLP for the first signaling information, and a third PLP for the second signaling information are all different from each other, obtain a first event related to the ROUTE/DASH service based on MPD (Media Presentation Description) and a second event related to the ROUTE/DASH service based on an event message box in DASH segments when the first and second events are delivered via broadcast, obtain a third event related to the MMT service based on AEI (Application Event Information) and a fourth event related to the MMT service based on an event information box in MPU (Media Processing Unit) when the third and fourth events are delivered via broadcast, obtain a fifth event related to the ROUTE/DASH service based on another MPD which is delivered via broadband when the fifth event is delivered via broadband, obtain a sixth event related to the MMT service based on another AEI which is delivered via broadband when the sixth event is delivered via broadband; and a media decoder configured to decode a video segment and an audio segment for the ROUTE/DASH service, and a video MPU and an audio MPU for the MMT service.

2. The digital receiver of claim 1, wherein the first event and the third event relate to at least one static event while the second event and the fourth event relate to at least one dynamic event.

3. The digital receiver of claim 2, wherein the at least one dynamic event relates to a real-time sports program.

4. The digital receiver of claim 3, wherein the control engine is further configured to obtain other events based on a video watermark or by querying to an event server when a query bit in an audio watermark is set, in a redistribution scenario.

5. The digital receiver of claim 4, wherein the redistribution scenario is a situation where the digital receiver is unable to receive a broadcast signal directly.

6. A method of processing multiple events received via hybrid networks in a digital receiver, the method comprising:

receiving a RF stream comprising SLT (Service List Table);

obtaining first signaling information for a ROUTE (Real-time Object Delivery over Unidirectional Transport)/DASH (Dynamic Adaptive Streaming over HTTP) service based on source IP address information, first destination IP address information and first destination port information included in the SLT;

obtaining second signaling information for a MMT (MPEG Media Transport) service based on second destination IP address information and second destination port information included in the SLT, wherein a first PLP (Physical Layer Pipe) for the SLT, a second PLP for the first signaling information, and a third PLP for the second signaling information are all different from each other;

obtaining a first event related to the ROUTE/DASH service based on MPD (Media Presentation Description) and a second event related to the ROUTE/DASH service based on an event message box in DASH segments when the first and second events are delivered via broadcast;

obtaining a third event related to the MMT service based on AEI (Application Event Information) and a fourth event related to the MMT service based on an event information box in MPU (Media Processing Unit) when the third and fourth events are delivered via broadcast;

obtaining a fifth event related to the ROUTE/DASH service based on another MPD which is delivered via broadband when the fifth event is delivered via broadband;

obtaining a sixth event related to the MMT service based on another AEI which is delivered via broadband when the sixth event is delivered via broadband; and decoding a video segment and an audio segment for the ROUTE/DASH service, and a video MPU and an audio MPU for the MMT service.

7. The method of claim 6, wherein the first event and the third event relate to at least one static event while the second event and the fourth event relate to at least one dynamic event.

8. The method of claim 7, wherein the at least one dynamic event relates to a real-time sports program.

9. The method of claim 8, further comprising:

obtaining other events based on a video watermark or by querying to an event server when a query bit in an audio watermark is set, in a redistribution scenario.

10. The method of claim 9, wherein the redistribution scenario is a situation where the digital receiver is unable to receive a broadcast signal directly.

* * * * *